United States Patent [19]
Itoh et al.

[11] Patent Number: 4,994,923
[45] Date of Patent: Feb. 19, 1991

[54] VIDEO SIGNAL RECORDING AND REPRODUCING APPARATUS WITH SIGNAL PROCESSING CIRCUIT FOR IMPROVEMENT OF PICTURE QUALITY

[75] Inventors: Shigeyuki Itoh, Yokohama; Hikaru Masui, Ashiya; Yoshizumi Watatani, Fujisawa, all of Japan

[73] Assignee: Hitachi, Ltd., Tokyo, Japan

[21] Appl. No.: 305,622

[22] Filed: Feb. 3, 1989

[30] Foreign Application Priority Data
Feb. 5, 1988 [JP] Japan .................................. 63-23924
Mar. 16, 1988 [JP] Japan ................................... 63-60521

[51] Int. Cl.⁵ .............................................. H04N 9/80
[52] U.S. Cl. ..................................... 358/319; 358/330
[58] Field of Search ............... 358/325, 310, 335, 330, 358/327, 319, 315

[56] References Cited
U.S. PATENT DOCUMENTS

| | | | |
|---|---|---|---|
| 4,145,705 | 3/1979 | Yoshinaka | 358/325 |
| 4,535,357 | 8/1985 | Penney | 358/319 |
| 4,691,247 | 9/1987 | Honjo et al. | 358/319 |
| 4,805,035 | 2/1989 | Kawakami et al. | 358/310 |
| 4,823,196 | 4/1989 | Goddard | 358/310 |
| 4,831,463 | 5/1989 | Faroudja | 358/330 |

Primary Examiner—Donald McElheny, Jr.
Attorney, Agent, or Firm—Antonelli, Terry, Stout & Kraus

[57] ABSTRACT

Herein disclosed is a color video signal recording and reproducing apparatus for recording and reproducing a luminance signal as a frequency-modulated wave and a chrominance signal as a down-converted chrominance signal in and from a recording medium. The color video signal recording and reproducing apparatus comprises: a demodulator for demodulating the down-converted chrominance signal reproduced from the recording medium to generate color difference signals R-Y and B-Y in a base frequency band; a signal processor for reducing noises from those color difference signals; and a modulator for subjecting the carrier wave, which has a frequency equal to that of a color subcarrier of a color video signal, to a quadrature two-phade modulation with the color difference signals processed by the signal processor, to reproduce the chrominance signal.

21 Claims, 19 Drawing Sheets

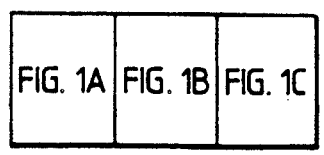
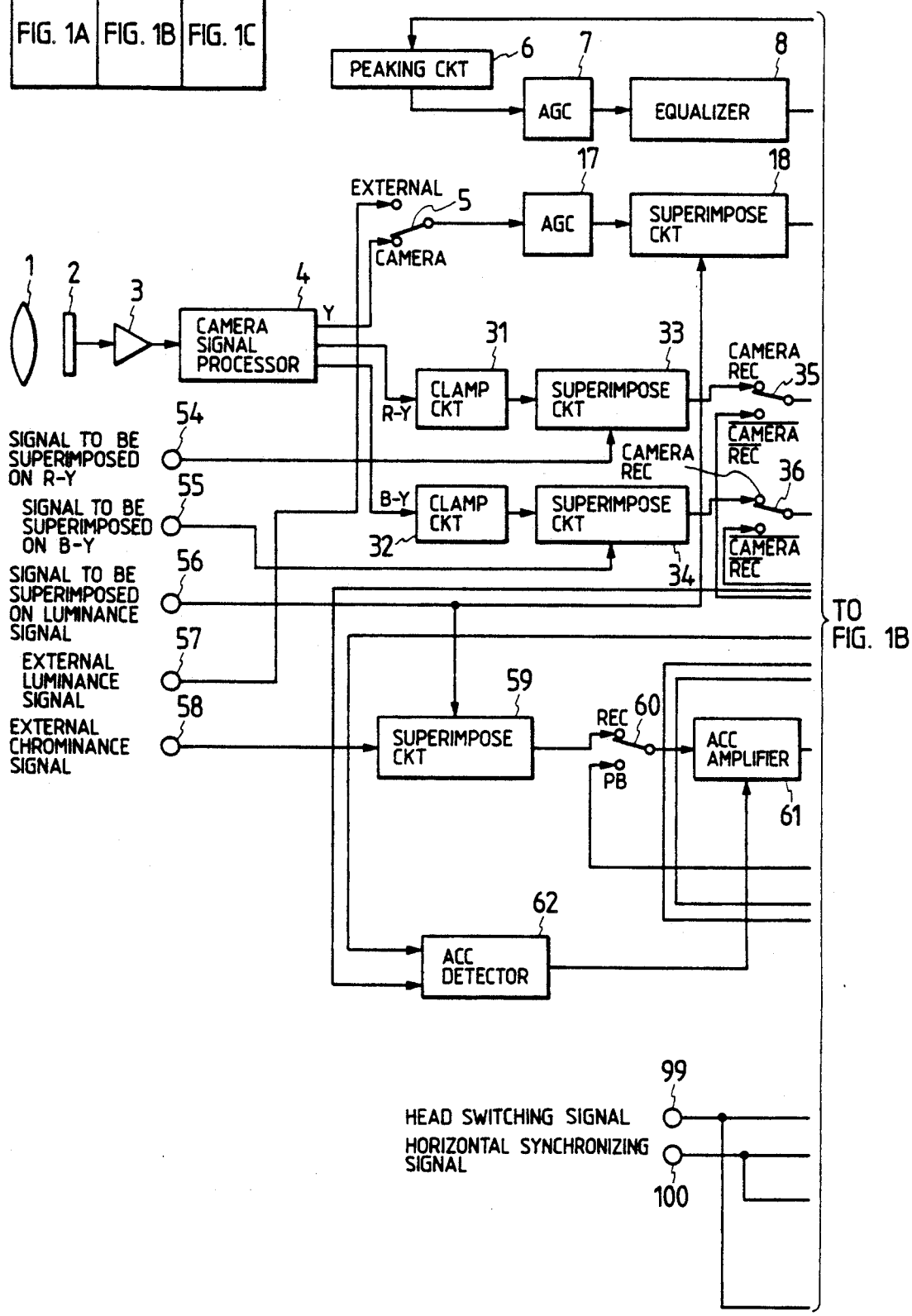

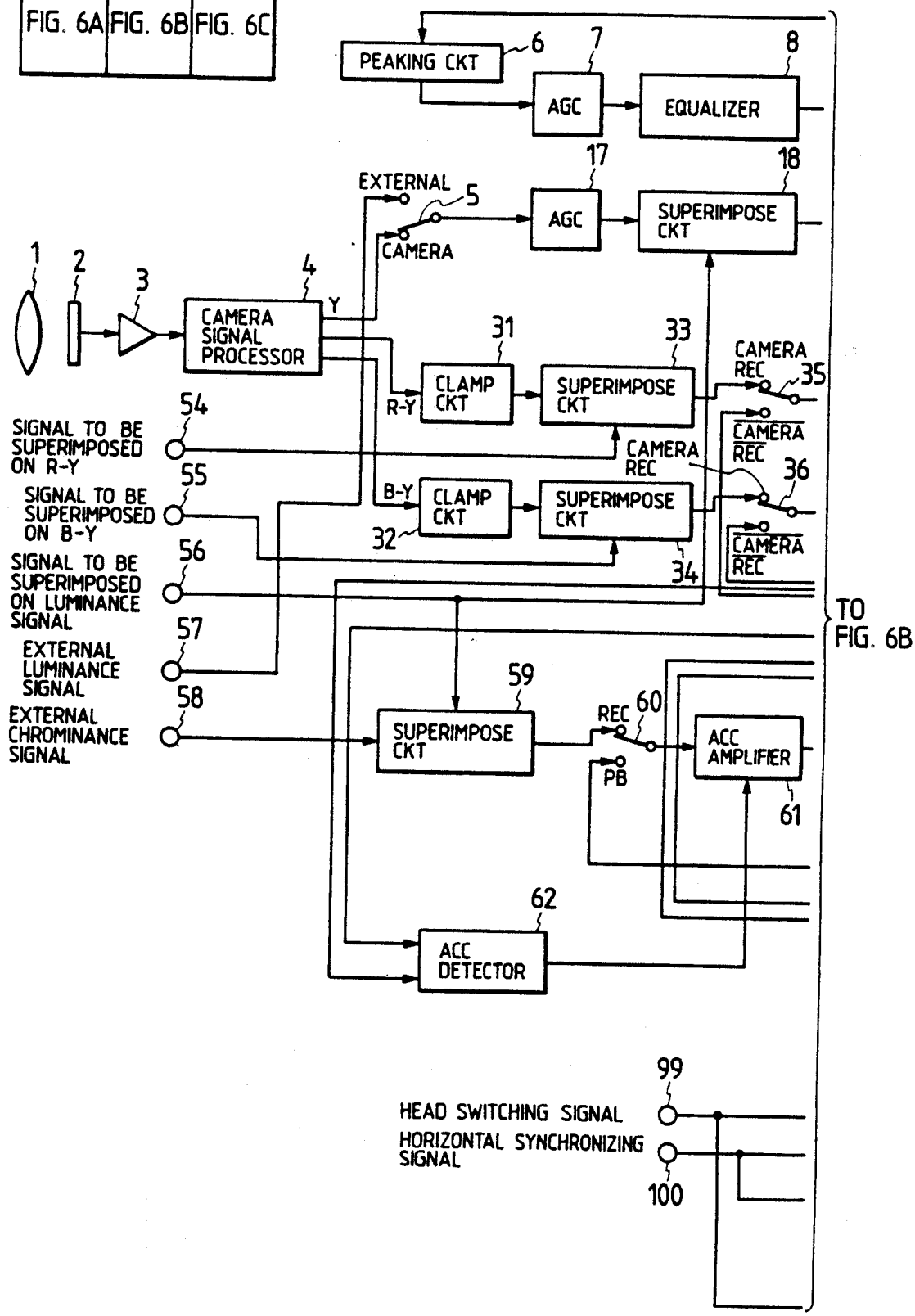

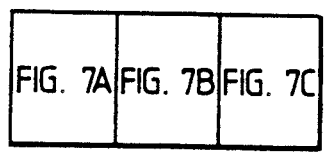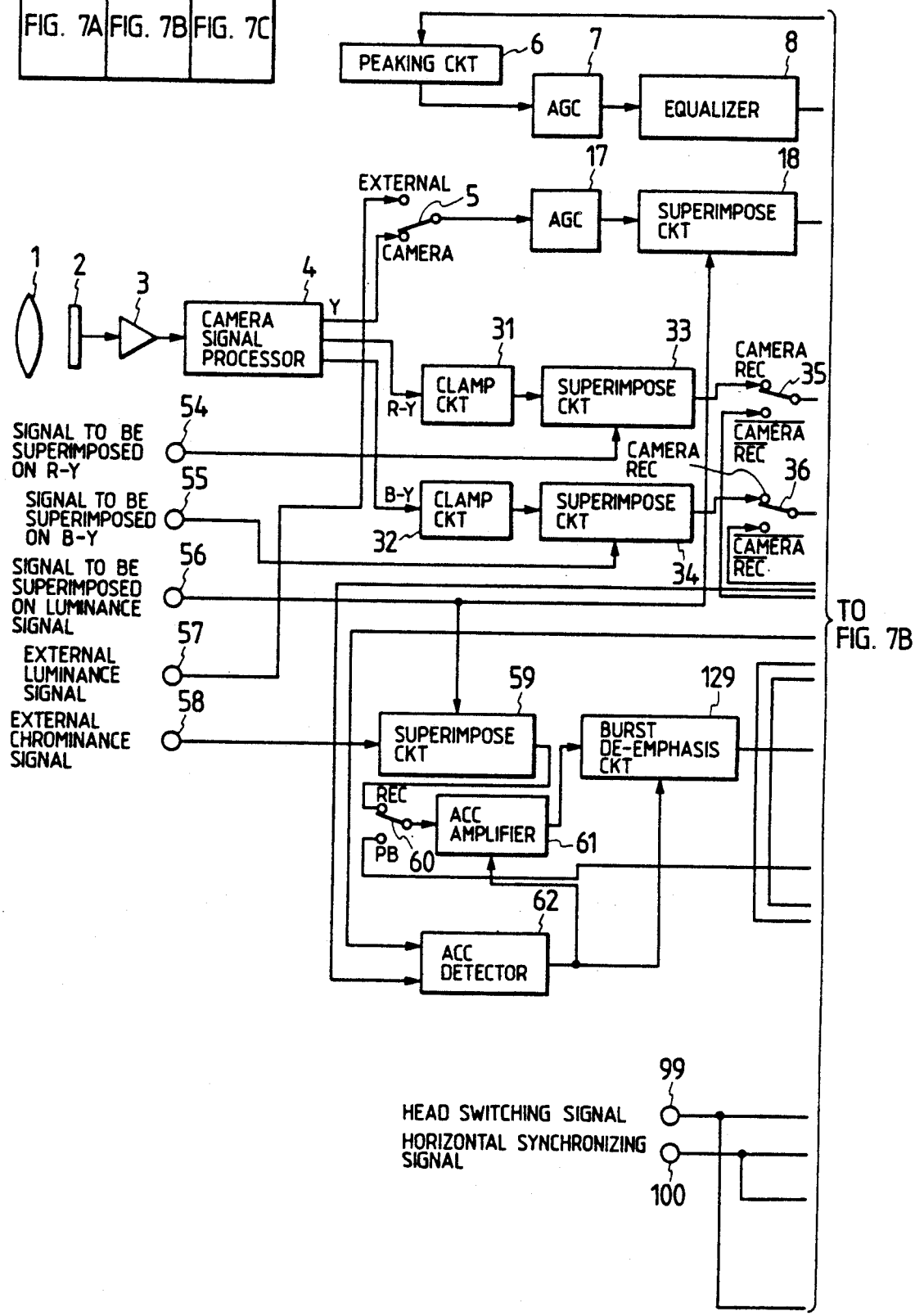

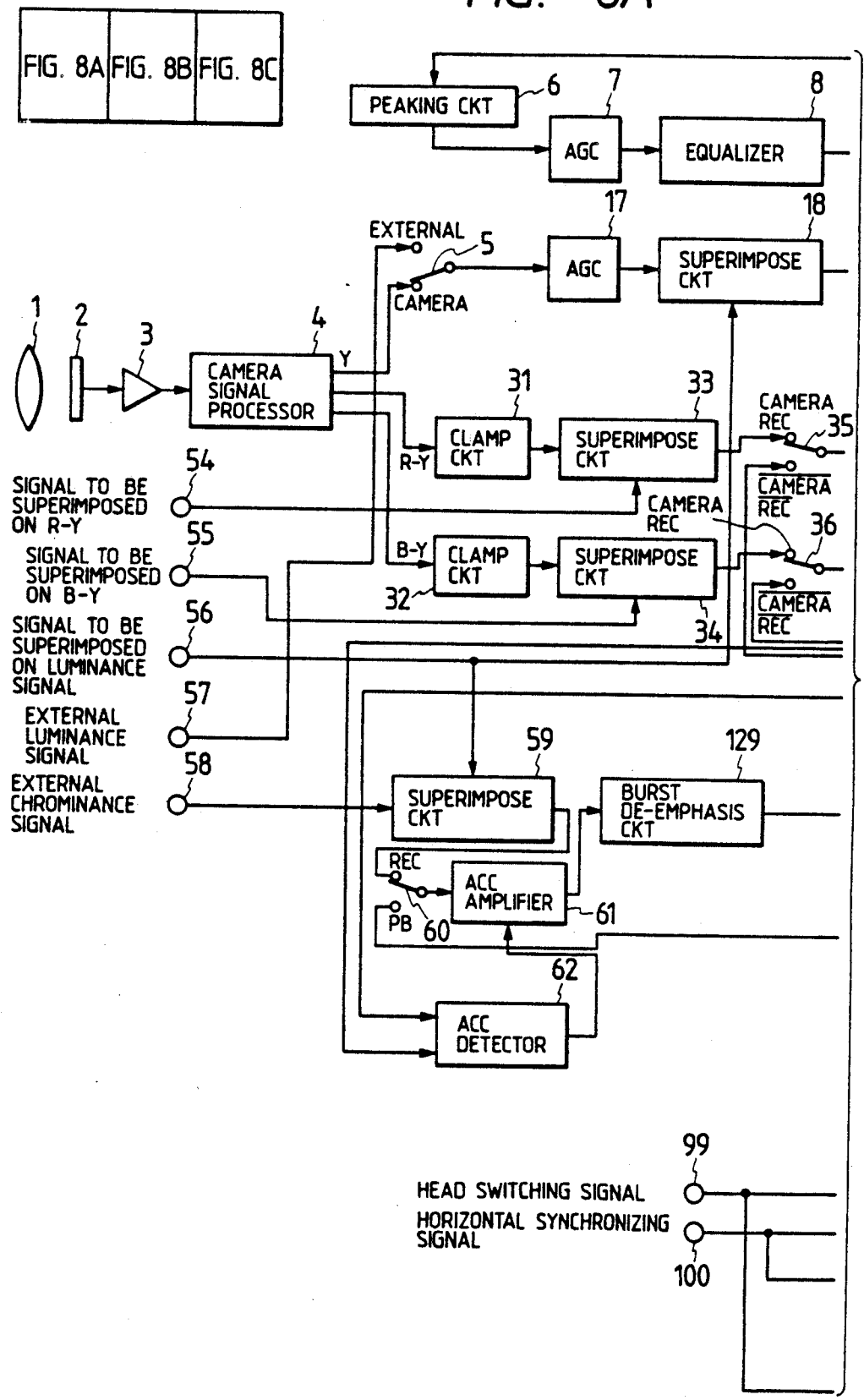

VIDEO SIGNAL RECORDING AND REPRODUCING APPARATUS WITH SIGNAL PROCESSING CIRCUIT FOR IMPROVEMENT OF PICTURE QUALITY

BACKGROUND OF THE INVENTION

The present invention relates to a video signal recording and reproducing apparatus and, more particularly, to a video signal recording and reproducing apparatus for recording and reproducing a luminance signal as a frequency-modulated signal and a chrominance signal as a signal frequency-converted into a low frequency band. The present invention also relates to a video signal recording and reproducing apparatus combined with a video camera.

In the video signal recording and reproducing apparatus using a magnetic tape as a recording medium, such as a video tape recorder (which will be shortly referred to as "VTR"), according to the prior art, as disclosed in Japanese Patent Application Publication No. 55-19116 and its corresponding U.S. Pat. No. 4,178,606, a carrier wave is frequency-modulated with a luminance signal so as to produce a signal frequency-modulated with the luminance signal (this frequency-modulated signal will be referred to as a "FM luminance signal"), and a chrominance signal is frequency-converted into a lower frequency band than that of the FM luminance signal (this frequency-converted signal will be referred to as a "down-converted chrominance signal"), so that the FM luminance signal and the down-converted chrominance signal are frequency-multiplexed, recorded on and reproduced from the recording medium.

In the video signal recording and reproducing apparatus of such type, the luminance signal is usually processed for a variety of S/N ratio improvements such as the noise reduction or dropout compensation, thus improving the picture quality of the reproduced image.

As to color difference signals, however, the chrominance signal, which is produced by the quadrature two-phase modulation of a carrier wave with the color difference signals, is directly converted into a low frequency band by frequency conversion means to form the down-converted chrominance signal. This chrominance is recorded in the magnetic recording medium. For reproductions, the down-converted chrominance signal is directly converted into a high frequency band by the frequency conversion means to provide the chrominance signal in the original carrier frequency. Since, in the video signal recording and reproducing apparatus of the prior art, each color difference signal is processed in the mode of a modulated wave, i.e., as the chrominance signal, it is difficult to reduce the noises, e.g., to clip noise pulses rising from the pedestal level or cancel the noises. Moreover, the dropout compensation is seriously difficult and is not commonly adopted because the continuity of the carrier phase in the chrominance signal has to be maintained.

SUMMARY OF THE INVENTION

An object of the present invention is to solve the problems described above and to provide a video signal recording and reproducing apparatus for improving the S/N ratio of color difference signals to improve the picture quality of a reproduced image when the color difference signals are to be recorded and reproduced as a down-converted chrominance signal.

The above-specified object is achieved by the present invention providing a video signal recording and reproducing apparatus which comprises first carrier generating means for generating a first carrier wave having a frequency lower than that of a color subcarrier of a color video signal, second carrier generating means for generating a second carrier wave having a frequency equal to that of the color subcarrier of the color video signal, first modulation means for modulating the first carrier wave with at least one color difference signal located in a base frequency band and to be recorded, demodulation means for demodulating a down-converted chrominance signal reproduced so as to output at least one color difference signal in the base frequency band, signal processing means for processing the at least one color difference signal outputted from the demodulation means in a predetermined manner for improvement of picture quality, and second modulation means for modulating the second carrier wave with the at least one color difference signal outputted from the signal processing means so as to generate a chrominance signal of a color video signal.

BRIEF DESCRIPTION OF THE DRAWINGS

In the accompanying drawings:

FIGS. 1A, 1B and 1C are block diagrams showing a video signal recording and reproducing apparatus according to one embodiment of the present invention;

FIGS. 6A, 6B, 6C, 7A, 7B, 7C and 8A, 8B, 8C are block diagrams showing video signal recording and reproducing apparatus according to other embodiments, of the present invention, respectivley;

DETAILED DESCRIPTION OF THE PREFERRED EMBODIMENTS

In each of the embodiments shown in the accompanying drawings, the present invention is applied to a VTR combined with a video camera.

Figure 1B:
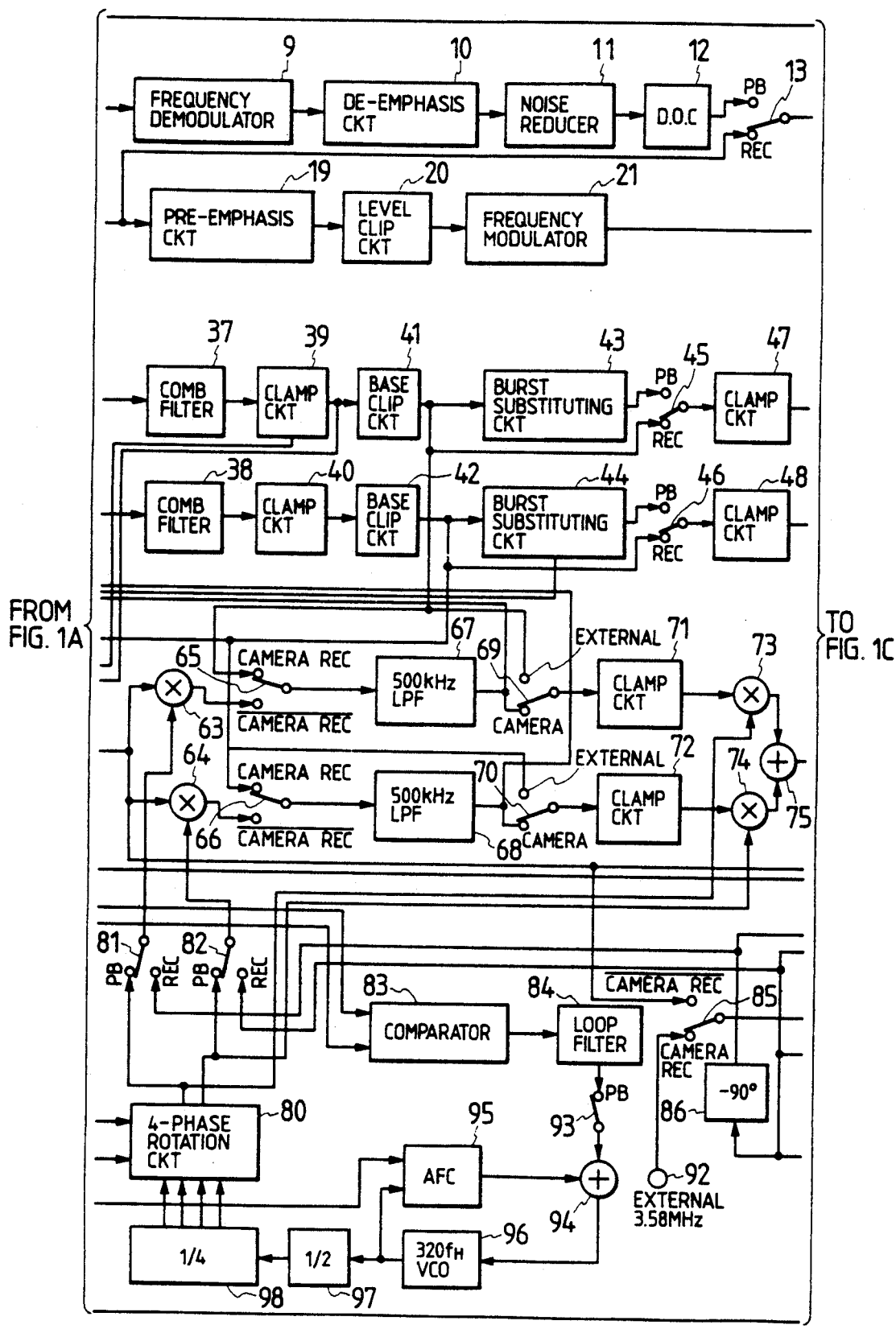
Figure 1C:
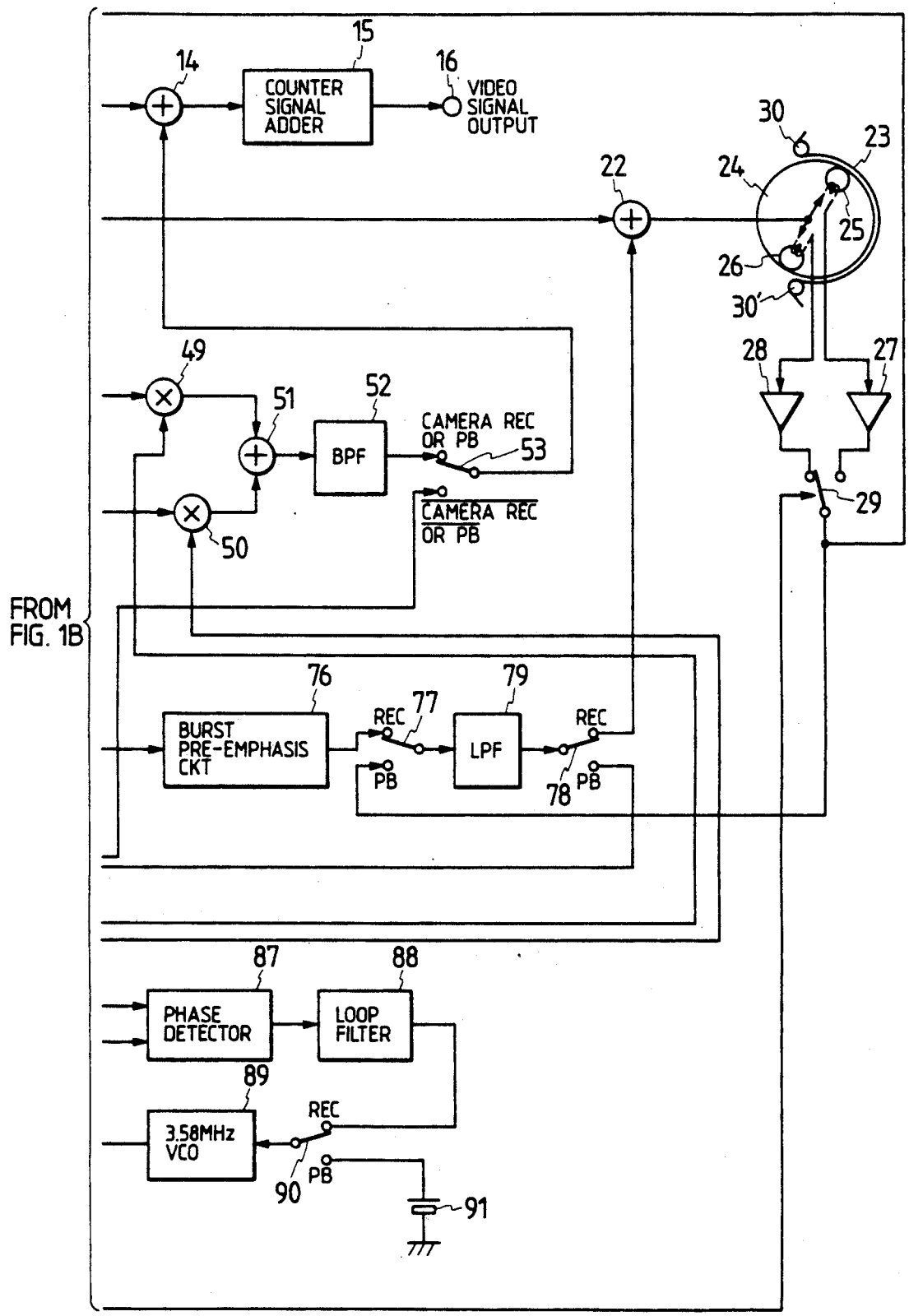

FIG. 1 is a block diagram showing a first embodiment of the present invention. In FIG. 1: reference numeral 1 designates a lens; numeral 2 a solid-state image sensor; numeral 3 a pre-amplifier; numeral 4 a camera signal processing circuit; numeral 5 a switch; numeral 6 a peaking circuit; numeral 7 an AGC (Automatic Gain Control) circuit; numeral 8 an equalizer; numeral 9 a frequency demodulator; numeral 10 a de-emphasis circuit; numeral 11 a noise reducer; numeral 12 a D.O. (Dropout) compensator; numeral 13 a switch; numeral 14 an adder; numeral 15 a counter signal adder; numeral 16 an output terminal; numeral 17 an AGC circuit; numeral 18 a superimpose circuit; numeral 19 an pre-emphasis circuit; numeral 20 a level clip circuit; numeral 21 a frequency modulation circuit; numeral 22 an adder; numeral 23 a magnetic tape; numeral 24 a rotary cylinder; numerals 25 and 26 video heads; numerals 27 and 28 pre-amplifiers; numeral 29 a switch; numerals 30 and 30' tape guides; numerals 31 and 32 clamp circuits; numerals 33 and 34 superimpose circuits; numerals 35 and 36 switches; numerals 37 and 38 comb filters; numerals 39 and 40 clamp circuits; numerals 41 and 42 base clip circuits; numerals 43 and 44 burst substituting circuits; numerals 45 and 46 switches; numerals 47 and 48 clamp circuits; numerals 49 and 50 multipliers; numeral 51 an adder; numeral 52 a BPF (Band-Pass Filter); numeral 53 a switch; numerals 54 to 58 input terminals; numeral 59 a superimpose circuit; numeral 60 a switch; numeral 61 an ACC (Automatic Chrominance level Control) amplifier; numeral 62 an ACC detector; numerals 63 and 64 multipliers; numerals 65 and 66 switches; numerals 67 and 68 LPFs (Low-Pass Filters); numerals 69 and 70 switches; numerals 71 and 72 clamp circuits; numerals 73 and 74 multipliers; numeral 75 an adder; numeral 76 a burst pre-emphasis circuit; numerals 77 and 78 switches; numeral 79 an LPF; numeral 80 a four-phase rotation circuit; numerals 81 and 82 switches; numeral 83 a comparator; numeral 84 a loop filter; numeral 85 a switch; numeral 86 a 90° phase shifter; numeral 87 a phase detector; numeral 88 a loop filter; numeral 89 a VCO (Voltage Controlled Oscillator); numeral 90 a switch; numeral 91 a reference voltage source; numeral 92 an input terminal; numeral 93 a switch; numeral 94 an adder; numeral 95 an AFC circuit; numeral 96 a VCO; numeral 97 a ½ counter; numeral 98 a ¼ counter; and numerals 99 and 100 input terminals.

As shown in FIG. 1, the video signal recording and reproducing apparatus is constructed such that it can record and reproduce both a color video signal from a video camera and a video signal (which will be referred to as an "external color video signal") from a television tuner. The lens 1, the solid-state image sensor 2, the pre-amplifier 3 and the camera signal processing circuit 4 constitute together the video camera, and a luminance signal of an external color video signal is inputted from the input terminal 57 whereas a chrominance signal thereof is inputted from the input terminal 58. Here will be described the apparatus for the NTSC system and of the VHS system. Therefore, the carrier frequency of the chrominance signal is set at 3.58 MHz, and the carrier frequency of the down-converted chrominance signal is set at 40 $f_H$ (wherein $f_H$: the horizontal scanning frequency).

The operations of this embodiment will be described in the following firstly in the case that an output signal of the video camera is to be recorded. In this case, in FIG. 1, the switches 5, 69 and 70 are closed to the camera side; the switches 13, 45, 46, 60, 77, 78, 81, 82 and 90 are closed to the REC side; the switches 35, 36, 65, 66 and 85 are closed to the camera REC side; the switch 53 is closed to the "camera REC or PB" side; and the switch 93 is opened.

From the camera signal processing circuit 4 of the video camera, there are separately outputted a luminance signal Y and two color difference signals R-Y and B-Y. These are all signals in a base frequency band, and a pulse (which will be referred to as a "burst pulse") for establishing a burst is added for each horizontal blanking period of one (in this case, the color difference signal B-Y) of the two color difference signals R-Y and B-Y.

The luminance signal Y passes through the switch 5 and has its level fluctuations reduced by the AGC circuit 17 until it is fed to the superimpose circuit 18. Here, in case a date, a title and so on are to be added to the picture, luminance component of an image signal expressing them are fed as a luminance superimpose signal from the input terminal 56 to the superimpose circuit 18 so that they are superimposed upon the luminance signal Y. The luminance signal Y thus outputted from the superimpose circuit 18 is emphasized of its high frequency component by the pre-emphasis circuit 19 and is clipped at its level, which might otherwise cause an over-frequency modulation, by the level clip circuit 20, until it is converted into an FM luminance signal by the frequency modulation circuit 21.

On the other hand, the color difference signals R-Y and B-Y are so clamped by the clamp circuits 31, and 32, respectively, that the blanking period may take a constant level, and are then fed to the superimpose circuits 33 and 34. When color difference components R-Y and B-Y of the picture signal expressing the date, title and so on, respectively, are fed as an R-Y superimpose signal and a B-Y superimpose signal from the input terminals 54 and 55, respectively, they are superimposed upon the color difference signals R-Y and B-Y, respectively. These superimpositions upon the color difference signals R-Y and B-Y may be accomplished by substituting the color difference signal R-Y by a DC voltage for the R-Y superimpose signal period and the color difference signal B-Y by a DC voltage for the B-Y superimpose signal period. By suitably setting the levels of those DC voltages, the hue and the color saturation displayed on the picture can be set arbitrarily and easily.

Incidentally, the clamp circuits 31 and 32 accomplish their clamping operations for the blanking period excepting the burst pulse period.

The color difference signals R-Y and B-Y outputted from the superimpose circuits 33 and 34 pass through the switches 35 and 36, respectively, and are fed to the comb filters 37 and 38 so that the interference components from the luminance signal Y are reduced. Here, the comb filters 37 and 38 have the comb filter characteristics in the base frequency band, accordingly they need not have such a high accuracy delay time (within an error range of about ±3 nsecs) as belongs to comb filters for the chrominance signal having the carrier frequency of 3.58 MHz so that the accuracy requirement can be drastically loosened. The color difference signals R-Y and B-Y outputted from the comb filters 37 and 38 are clamped by the clamp circuits 39 and 40, respectively, for the blanking period excepting the burst pulse period, and noises rising from the pedestal level are clipped by the base clip circuits 41 and 42 to reduce the noises for the pedestal level period. The color difference signals R-Y and B-Y outputted from the base clip circuits 41 and 42 pass through the switches 65 and 66, respectively, and have their bands limited by the LPFs 67 and 68. After this, the color difference signals R-Y and B-Y pass through the switches 69 and 70, respectively, and are clamped by the clampl circuits 71 and 72 like the clamp circuits 31, 39, 32 and 40 until they are fed to the multipliers 73 and 74.

The multipliers 73 and 74 constitute together with the adder 75 a quadrature two-phase modulation circuit for producing the down-converted chrominance signal directly from the color difference signals R-Y and B-Y in the base frequency band. A carrier generator for modulation is composed of the four-phase rotation circuit 80, the AFC circuit 95, the VCO 96, the ½ counter 97 and the ¼ counter 98. An output signal of the VCO 96 is compared in frequency with a horizontal synchronizing signal from the input terminal 100 by the AFC circuit 95 so that the VCO 96 is controlled with the error voltage. As a result, the output frequency of the VCO 96 is set at 320 $f_H$. The output signal of this VCO 96 has its frequency divided by the ½ counter 97 and further by the ¼ counter 98 so that this ¼ counter 98 outputs four signals having a frequency of 40 $f_H$ and their phases being different from each other by 90°. The four-phase rotation circuit 80 is controlled with a head switching signal from the input terminal 99 and the horizontal synchronizing signal from the input terminal 100 to switch and select the four output signals of the ¼ counter 98 each horizontal scanning period (which will be referred to as "1H") thereby to output two carrier signals which have their phases shifted sequentially by 90° for 1H and different by 90° from each other. Here, the rotary cylinder 24 is equipped thereon with the two video heads 25 and 26 so that the magnetic tape 23 is guided by the tape guides 30 and 30' to run helically in abutment over about 180° on the outer circumference of the cylinder 24. The head switching signal from the input terminal 99 has different levels for the rotation period of the cylinder 24, in which the video head 25 scans the magnetic tape 23, and for the rotation period of the cylinder, in which the video head 26 scans the magnetic tape 23. By these controls of the head switching signal, the two carrier waves outputted from the four-phase rotation circuit 80 have their phases delayed 90° by 90° for each 1H period, in which one of the video heads 25 and 26 scans the magnetic tape 23, if the phases are advanced 90° by 90° for each 1H period, in which the other video head scans the magnetic tape The multiplier 73 accomplishes the balanced modulation of the carrier wave coming from the four-phase rotation circuit 80 and delayed by 90° with the color difference signal R-Y from the clamp circuit 71, whereas the multiplier 74 accomplishes the balanced modulation of the other carrier wave coming from the four-phase rotation circuit 80 with the color difference signal B-Y from the clamp circuit 72. Then, the output signals of the multipliers 73 and 74 are added by the adder 75 to produce the down-converted chrominance signal. This down-converted chrominance signal has a burst signal which is produced in the multiplier 74 by modulating the carrier wave of 40 $f_H$ with the burst pulse added for the horizontal blanking period of the color difference signal B-Y.

This down-converted chrominance signal is so processed in the burst pre-emphasis circuit 76 as to amplify the burst signal by 6 dB. After this, the processed chrominance signal passes through the switch 77 and has its frequency band so restricted in the LPF 79 as to have a frequency band lower than that of the FM luminance signal outputted from the frequency modulation circuit 21. The chrominance signal thus band-restricted passes through the switch 78 and has its frequency multiplexed in the adder 22 with the FM luminance signal from the frequency modulation circuit 21. The output signal of the adder 22 is suitably amplified and is then fed to the video heads 25 and 26 until it is recorded in the magnetic tape 23.

On the other hand, the luminance signal Y outputted from the superimpose circuit 18 and the color difference signals R-Y and B-Y outputted from the base clip circuits 41 and 42 are used for monitoring operations, too.

For these operations, the luminance signal Y is fed through the switch 13 to the adder 14.

Moreover, the color difference signals R-Y and B-Y outputted from the base clips 41 and 42 pass through the switches 45 and 46, respectively, and are then clamped by the clamp circuits 47 and 48 like the clamp circuits 31 and 32 until they are fed to the multipliers 49 and 50. These multipliers 49 and 50 constitute together with the adder 51 a quadrature two-phase modulation circuit for producing a chrominance signal having a carrier frequency of 3.58 MHz. A carrier generator for this operation is composed of the 90° phase shifter 86, the phase detector 87, the loop filter 88 and the VCO 89. An output signal of 3.58 MHz of the VCO 89 is fed to the phase detector 87 so that it is compared in phase with a stable reference signal fed from the input terminal 92 through the switch 85 and having a frequency of 3.58 MHz. The output error signal of the phase detector 87 is corrected by the loop filter 88 and is fed as the control signal through the switch 90 to the VCO 89. As a result, the output signal of the VCO 89 is phase-synchronized and stabilized with the reference signal from the input terminal 92. The output signal of the VCO 89 is fed as the carrier wave to the multiplier 50 and is phase-shifted by the 90° phase shifter 86 until it is fed as the carrier wave to the multiplier 49.

From the multipliers 49 and 50, respectively, there are outputted the color difference signals R-Y and B-Y which are produced by the balanced modulation of the carrier wave having the frequency of 3.58 MHz. These color difference signals R-Y and B-Y are added by the adder 51 to produce the chrominance signal. This chrominance signal has its frequency band restricted by the BPF 52 and passes through the switch 53 so that it is added to the luminance signal Y from the switch 13 by the adder 14 to produce the color video signal. This color video signal is fed to the counter signal adder 15 so that the counted value of the tape counter is superimposed, if necessary, and outputted from the output terminal 16.

In the case that the output signal of the video camera is to be recorded, as described above, it is possible to produce a recording signal, which is composed of the FM luminance signal and the down-converted chrominance signal, directly from the luminance signal Y and the color difference signals R-Y and B-Y in the base frequency band. Before the modulation, moreover, these luminance signal Y and color difference signals R-Y and B-Y can be processed for improvement of picture quality.

Next, the recording operations of the external color video signal of this embodiment will be described in the following. Incidentally, in this case: the switches 5, 69 and 70 are closed to the external side; the switches 13, 45, 46, 60, 77, 78, 81, 82 and 90 are closed to the REC side; the switches 35, 36, 65, 66 and 85 are closed to the side (which will be referred to as the "camera REC" side) other than the "camera REC" side; the switch 53 is closed to the side (which will be referred to as the "camera REC or PB" side) other than the "camera REC or PB side"; and the switch 93 is opened.

The external color video signal is separated into the luminance signal Y and the chrominance signal C, the former of which is fed to the input terminal 57 and the latter of which is fed to the input terminal 58. The luminance signal Y passes through the switch 5 and is processed like the luminance signal Y from the video camera by the AGC circuit 17, the superimpose circuit 18, the pre-emphasis circuit 19 and the level clip circuit 20 so that the FM luminance signal is produced by the frequency modulation circuit 21 and fed to the adder 22. On the other hand, the luminance signal outputted from the superimpose circuit 18 is fed through the switch 13 to the monitor similarly to the luminance signal Y outputted from the video camera.

The chrominance signal C inputted from the input terminal 58 is fed to the superimpose circuit 59 and is processed so that it may take the pedestal level, if necessary, for the period of the luminance superimpose signal from the input terminal 56. The chrominance signal C outputted from the superimpose circuit 59 is fed through the switch 60 to the ACC amplifier 61 so that its level is so controlled as to geive a constant level to the burst signal by the detected output from the ACC detector 62. The chrominance signal C outputted from the ACC amplifier 61 is fed to the multipliers 63 and 64.

The multipliers 63 and 64 constitute together a synchronizing demodulator. The carrier generator of 3.58 MHz of this case is also composed of the 90° phase shifter 86, the phase detector 87, the loop filter 88 and the VCO 89. The chrominance signal outputted from the ACC amplifier 61 is fed through the switch 85 to the phase detector 87 so that the carrier wave of 3.58 MHz having its phase synchronized with the burst signal of that chrominance signal is produced from the VCO 89, as has been described hereinbefore. Incidentally, the phase detector 87 compares the phases of the burst signal of the chrominance signal and the output signal of the VCO 89. For this operation, a burst gate is disposed either in the phase detector 87 or just upstream of the switch 85.

The output signal of the VCO 89 is fed as the carrier wave through the switch 82 to the multiplier 64 so that the color difference signal B-Y in the base frequency band is demodulated from the chrominance signal C. Moreover, the output signal of the VCO 89 is phase-shifted by the 90° phase shifter 86 and fed as the carrier wave through the switch 81 to the multiplier 63. As a result, the color difference signal R-Y is demodulated from the chrominance signal C.

These color difference signals R-Y and B-Y pass through the switches 65 and 66, respectively, and have their frequency bands limited by the LPF 67 and 68 to pass through the switches 35 and 36. Like the color difference signals R-Y and B-Y outputted from the video camera, the color difference signal R-Y is processed by the comb filter 37, the clamp circuit 39 and the base clip circuit 41, whereas the color difference signal B-Y is processed by the comb filter 38, the clamp circuit 40 and the base clip circuit 42. The color difference signals R-Y and B-Y outputted from the base clip circuits 41 and 42 pass through the switches 69 and 70, respectively, and are clamped by the clamp circuits 71 and 72 until they are fed to the multipliers 73 and 74. The subsequent processings are similar to those for the color difference signals R-Y and B-Y outputted from the video camera so that the down-converted chrominance signal is fed from the switch 78 to the adder 22 and recorded together with the FM luminance signal in the magnetic tape 23.

The chrominance signal for the monitoring operation is produced by the ACC amplifier 61 and fed through the switch 53 to the adder 14.

The burst substituting circuits 43 and 44 substitute the burst pulse of the color difference signals R-Y and B-Y, which are outputted from the base clip circuits 41 and 42, by the burst pulse of the correct level. In case the external color video signal is to be recorded, the burst signal in the chrominance signal C is demodulated in synchronism with the carrier wave of 3.58 MHz by the multipliers 63 and 64 so as to produce a demodulated burst pulse. As a result, there are the burst pulses for the horizontal blanking periods of the color difference signals R-Y and B-Y outputted from the base clip circuits 41 and 42, but in the case of the NTSC system, since the output signal of the VCO 89 is synchronized in phase with the burst signal of the chrominance signal, the color difference signal R-Y outputted from the base clip circuit 41 contains no burst pulse.

If the chrominance signal C outputted from the ACC amplifier 61 has its level fluctuating, the level of the burst signal also fluctuates so that the burst pulse of the color difference signal B-Y outputted from the base clip circuit 42 has its level fluctuating. The burst pulse of this color difference signal B-Y has its level compared by the ACC detector 62 with that of the reference level signal indicating the correct level of the burst pulse set in the burst substituting circuit 44 so that their difference signal is fed as the controlling voltage to the ACC amplifier 61. As a result, this ACC amplifier 61 controls the level of the chrominance signal C such that the burst level of the chrominance signal C may be equalized with the reference level set in the burst level substituting circuit 44.

Thus, in case the external color video signal is to be recorded, too, the processing can be accomplished to improve the picture quality of the chrominance signal, and the processing means can be used both for the color difference signal outputted from the video camera and for the external color video signal.

Next, the reproducing operations of this embodiment will be described in the following. In this case: the switches 13, 45, 46, 60, 77, 78, 81, 82 and 90 are closed to the PB side; the switches 35, 36, 65, 66 and 85 are closed to the camera-REC side; the switch 53 is closed to the "camera REC or PB" side; and the switch 93 is closed. In this case, the switches 69 and 70 may be closed to either the "camera" or "outside".

The reproduced signals reproduced by the video heads 25 and 26 are amplified by the pre-amplifiers 27 and 28, respectively, and are alternately selected to a continuous reproduced signal by the switch 29 which is controlled with the head switching signal from the input terminal 99.

This reproduced signal is fed, on one hand, to the peaking circuit 6 to extract the FM luminance signal and correct its frequency characteristics. The FM luminance signal thus extracted is cleared of the level fluctuations of each of the video heads 25 and 26 by the AGC circuit 7 and is processed by the equalizer 8 until it is demodulated to the luminance signal in the base frequency band by the frequency demodulator 9. This luminance signal is de-emphasized by the de-emphasis circuit 10 and processed to reduce, i.e., clip or cancel the noises by the noise reducer. The luminance signal thus noise-reduced is dropout-compensated by the D.O. compensator 12 until it is fed through the switch 13 to the adder 14.

The reproduced signal outputted from the switch 29 is also fed through the switch 77 to the LPF 79 so that the down-converted chrominance signal is extracted.

This down-converted chrominance signal is fed through the switches 78 and 60 to the ACC amplifier 61 and has its level controlled to hold the level of the burst signal constant. After this, the down-converted chrominance signal is fed to the multipliers 63 and 64 so that it is demodulated into the color difference signals R-Y and B-Y at the base frequency band. These color difference signals R-Y and B-Y pass through the switches 65 and 66, respectively, to have their frequency bands limited to 500 kHz by the LPFs 67 and 68. The color signals R-Y and B-Y thus limited are fed through the switches 35 and 36 to the comb filters 37 and 38 so that they are cleared of the unnecessary components such as the cross-talk components which come from the adjacent track when they are reproduced from the magnetic tape 23, and are subjected to the dropout compensation, as will be described hereinafter. The color difference signals R-Y and B-Y outputted from the comb filters 37 and 38 are clamped by the clamp circuit 39 for the blanking period excepting the burst pulse period and are cleared of the noises by the base clips of the base clip circuits 41 and 42.

Here, like the aforementioned case of recording the external color video signal, the ACC detector 62 compares the levels of the reference level signal from the burst level substituting circuit 44 and the burst pulse of the color difference signal B-Y outputted from the base clip circuit 42 and outputs the controlling voltage to be fed to the ACC amplifier 61. Since this burst pulse is pre-emphasized by 6 dB by the burst pre-emphasis circuit 76 during the recording operation, the level of the reference level signal to be fed from the burst level substituting circuit 44 to the ACC detector 62 is higher than the normal burst level by 6 dB.

On the other hand, the carrier generator for the multipliers 63 and 64 is composed of the four-phase rotation circuit 80, the comparator 83, the loop filter 84, the adder 94, the AFC circuit 95, the VCO 96, the ½ counter 97 and the ¼ counter 98. As has been described hereinbefore, the VCO 96 responds to the output signal of the AFC circuit 95 to output the signal having a frequency of 320 $f_H$, which has its frequency divided by the ½ counter 97 and the ¼ counter 98 into four signals of 40 $f_H$ having different phases shifted by 90°. The four-phase rotation circuit 80 selects the output signals of the ¼ counter 98 sequentially to form two carrier waves which have phases being different by 90° and switched by 90° for each 1H period. These two carriers have the same phase changing directions as those of the recording operation. Specifically, the four-phase rotation circuit 80 changes the phase of the carrier wave, which is to be fed to the multiplier 63, 90° by 90° for each 1H period so that the carrier wave may be in phase with the carrier wave of the balanced-modulated color difference signal R-Y in the down-converted chrominance signal outputted from the ACC amplifier 61. The four-phase rotation circuit 80 further changes the phase of the carrier wave, which is to be fed to the multiplier 64, 90° by 90° for each 1H period so that the carrier wave may be in phase with the balanced-modulated carrier wave of the color difference signal B-Y. The head four-phase rotation circuit 80 uses the head changing signal as the reference for thus regulating the phases of the individual carrier waves.

The reproduced down-converted chrominance signal has phase fluctuations. If this down-converted chrominance signal is demodulated in synchronism with the carrier wave produced from the output of the VCO 96 of a constant phase, the hue and the color saturation will change. In order to prevent these changes, there is provided a phase control system for the VCO 96, which is composed of the comparator 83 and the loop filter 84. Now, if phase fluctuations are present in the reproduced down-converted chrominance signal and if a phase error arises between the balanced-modulated color difference signal R-Y and the carrier wave fed to the multiplier 63, an unnecessary pulse (which will be referred to as a "pseudo-burst pulse") is generated for the horizontal blanking period of the demodulated color difference signal R-Y.

The comparator 83 is fed with both the output color difference signal R-Y of the clamp circuit 39, which is fed with the demodulated color difference signal R-Y, and the reference level signal indicating the blanking level, at which the color difference signal R-Y is to be clamped. Then, the comparator 83 compares the levels of the reference level signal and the pseudo-burst pulse of the color difference signal R-Y for the blanking period. This level difference expresses the phase difference between the balanced-modulated color difference signal R-Y of the down-converted chrominance signal, which is fed to the multiplier 63, and the carrier wave from the carrier generator. This output signal of the comparator 83 expressing the level difference is corrected by the loop filter 84 and then added through the switch 93 to the output signal of the AFC circuit 95 by the adder 94 until it is fed to the VCO 96. Thus, the VCO 96 is so phase-controlled that the reproduced down-converted chrominance signal may have no phase difference, even if its phase fluctuates, from the carrier wave fed to the multipliers 63 and 64. As a result, the color difference signals R-Y and B-Y obtained from the multipliers 63 and 64 are not influenced by those phase fluctuations.

The color difference signals R-Y and B-Y outputted from the base clip circuits 41 and 42 are substituted in the burst level substituting circuits 43 and 44, respectively, by the burst pulse of the correct level and are clamped through the switches 45 and 46 by the clamp circuits 47 and 48, as has been described hereinbefore, until they are fed to the multipliers 49 and 50. The carrier generator for these multipliers 49 and 50 is composed of the 90° phase shifter 86, the VCO 89 and the reference voltage source 91. The VCO 89 generates a stable carrier wave of 3.58 MHz with the reference voltage coming from the reference voltage source 91. This carrier wave is fed to the multiplier 50 and phase-shifted by the 90° phase shifter 86 until it is fed to the multiplier 49. As a result, the chrominance signal having the carrier frequency of 3.58 MHz is generated by the quadrature two-phase modulator which is composed of the multipliers 49 and 50 and the adder 51.

This chrominance signal has its frequency band limited by the BPF 52 and is added through the switch 53 by the adder 14 to the luminance signal coming from the D.O. compensator 12, to generate the color video signal of the NTSC system for the monitoring operation.

Thus, even in the reproduction, the chrominance signal is processed to improve the picture quality, and the processing means for the recording operation is commonly used as the image quality improving means.

Figure 2:
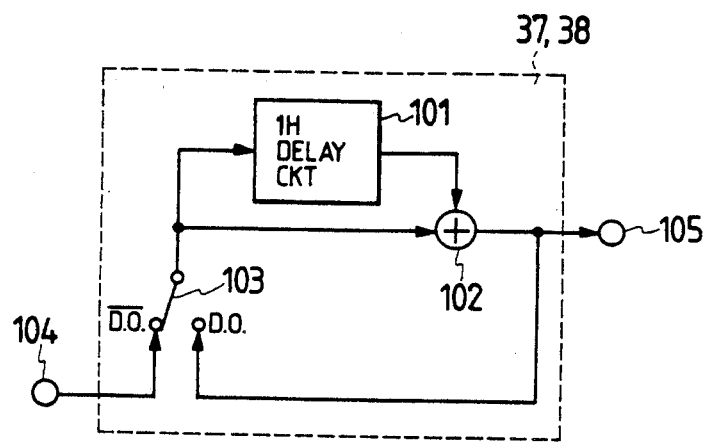
FIGS. 2, 3 and 4 are block diagrams showing specific examples of a comb filter of FIG. 1, respectivley.

FIG. 2 is a diagram showing the structure of one specific example of the comb filters 37 and 38 of FIG. 1. Reference numeral 101 designates a 1H delay circuit; numeral 102 an adder; numeral 103 a switch; numeral 104 an input terminal; and numeral 105 an output terminal.

In FIG. 2, the color difference signal (R-Y or B-Y) in the base frequency band is inputted from the input terminal 104. The switch 103 is closed to the side (which will be referred to as the "$\overline{D.}/$" side) other than the "D.O" side during the recording operation but is to the D.O. side at the time when the dropout occurs during the reproducing operation.

The occurrence of the dropout is detected by the dropout detector belonging to the D.O. (dropout) compensator 12. This dropout detector detects the dropout of the luminance signal to output a detection signal when the dropout occurs. In response to this detection signal, the D.O. compensator 12 compensates the dropout of the luminance signal. This detection signal is also used for controlling the switch 103. Specifically, this switch 103 is closed to the D.O. side in response to that detection signal. The 1H delay circuit 101 is composed of a CCD (Charge Coupled Device) delay circuit and a LPF for reducing clock pulses.

The color difference signal in the base frequency band inputted from the input terminal 104 passes through the switch 103 and is fed directly to the adder 102 and, after delayed by the 1H delay circuit 101, to the adder 102. The 1H delay circuit 101 and the adder 102 produce together the comb filter characteristics, which are identical to the frequency spectrum of the color difference signal in the base frequency band, to reduce the noises (or interleaved noises), which have their frequencies interleaving into the color difference signal, such as the cross-talk from the adjacent tracks.

For the dropout period, moreover, the switch 103 is closed to the D.O. side so that the color difference signal outputted from the adder 102 is fed through the switch 103 to the 1H delay circuit 101 and the adder 102. As a result, the dropout of the color difference signal is compensated.

Thus, the color difference signal has its dropout compensated and is subjected to the quadrature two-phase modulation, as has been described with reference to FIG. 1, so that the carrier phase of the chrominance signal thus produced is kept continuous.

Figure 3:
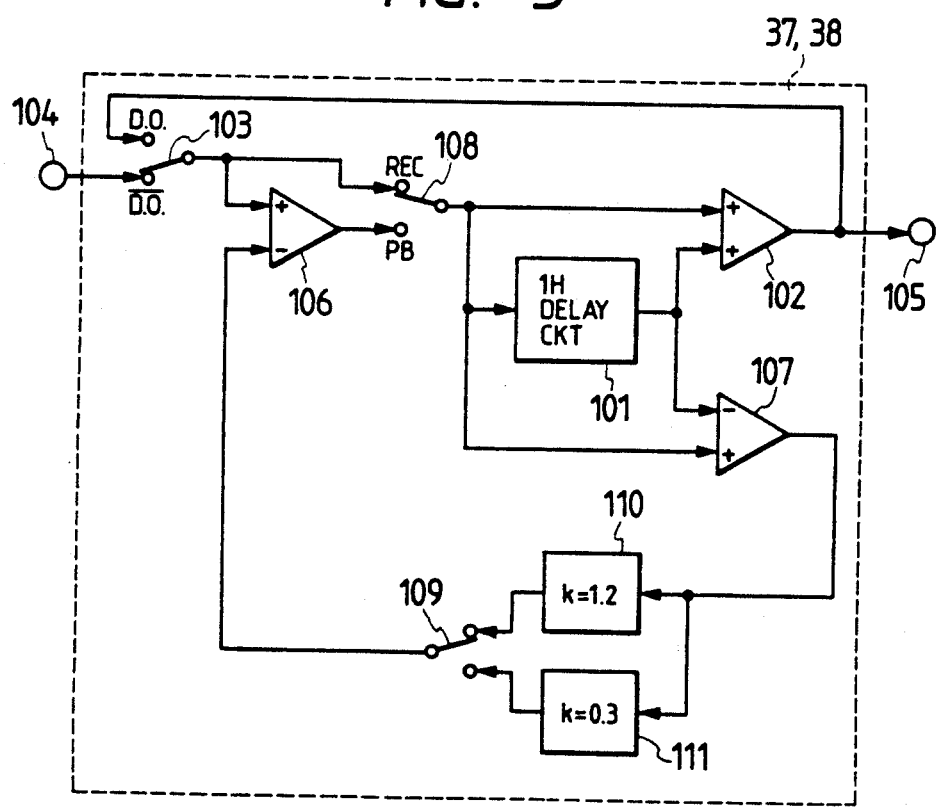

FIG. 3 is a block diagram showing another specific example of the comb filters 37 and 38 of FIG. 1. Reference numerals 106 and 107 designate subtractors; numerals 108 and 109 designate switches; and numerals 110 and 111 designate amplifiers. The remaining parts corresponding to those of FIG. 2 are designated at the common reference characters.

In FIG. 3, for the recording operation, the switch 108 is closed to the REC side so that the comb filter characteristics are obtained by the 1H delay circuit 101 and the adder 102.

For the reproducing operation, the switch 108 is closed to the PB side, and the subtractors 106 and 107 and one of the amplifiers 110 and 111 are added to constitute a feedback comb filter. The input and output color difference signals of the 1H delay circuit 101 are subtracted by the subtractor 107, and the signal of the trough of the frequency spectrum of the color difference signals is extracted and multiplied 1.2 or 0.3 times by the amplifier 110 or 111 (which have feedback constants k=1.2 and 0.3, respectively). The signal thus multiplied is fed to the subtractor 106 to subtract the color difference signal inputted. As a result, the trough of the frequency spectrum of the color difference signal is more sufficiently attenuated to enhance the effect of suppressing the interleaved noises.

Incidentally, the switch 109 is switched and controlled depending upon the presence or absence of the correlation (i.e., vertical correlation) between a certain 1H signal and a subsequent 1H signal. In the presence of the correlation, the switch 109 selects the output signal of the amplifier 110. In the absence of the correlation, on the contrary, the switch 109 selects the output signal of the amplifier 111. The judgement of the vertical correlation is accomplished by comparing the level of a certain 1H signal and the level of the subsequent 1H signal. If the difference between the levels of the two signals is smaller than a predetermined threshold value, it is judged that the correlation is present. Otherwise, it is judged that the correlation is absent. This judgement is performed by a judging circuit for outputting a judgement signal. This threshold value is at 5 to 10 IRE (IRE is a unit at which 100 IRE covers the pedestal level, i.e., black level to the white peak level of the video signal). If, in the case of the present specific example, the level difference between a certain 1H signal and the subsequent 1H signal is 5 IRE or more, the switch 109 selects the output signal of the amplifier 111 as the result of judging the absence of the correlation. For the burst pulse period, on the other hand, the switch 109 selects the output signal of the amplifier 111. For dropout period, the switch 103 is closed to the D.O side like the specific example of FIG. 2.

Figure 4:
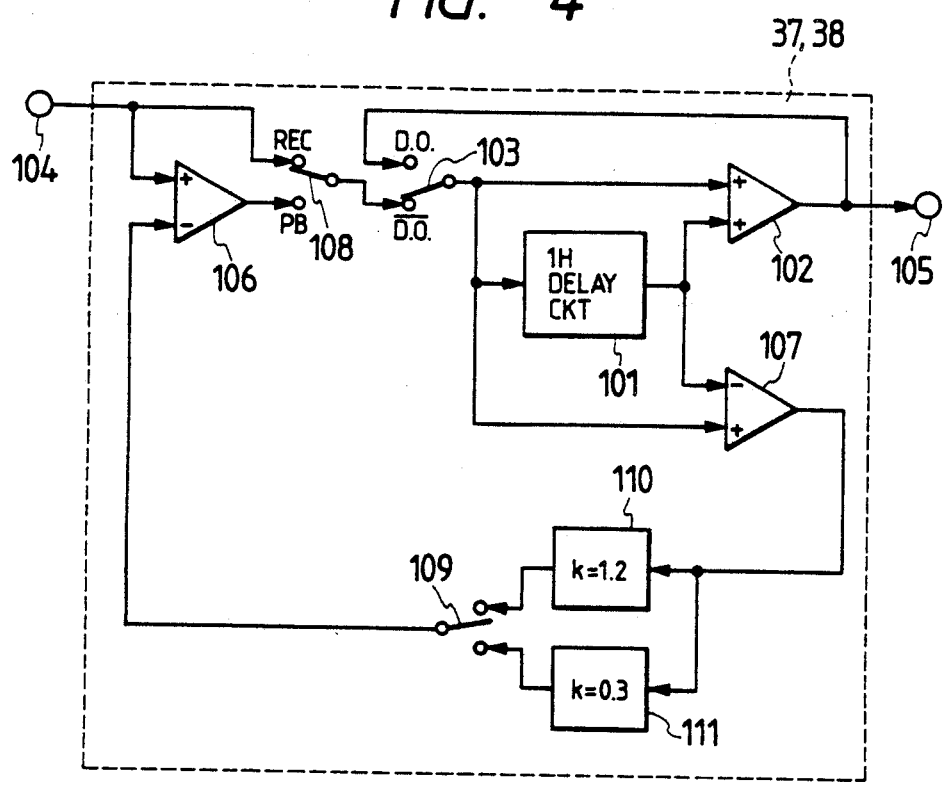

FIG. 4 is a block diagram showing still another specific example of the comb filters 37 and 38 of FIG. 1. The parts corresponding to those of FIG. 3 are designated at the common reference characters.

In this specific example, the dropout compensating switch 103 is disposed downstream of the switch 108. The remaining parts are similar to those of the comb filter shown in FIG. 3, and the operations are also similar to those of the comb filter shown in FIG. 3.

Figure 5:
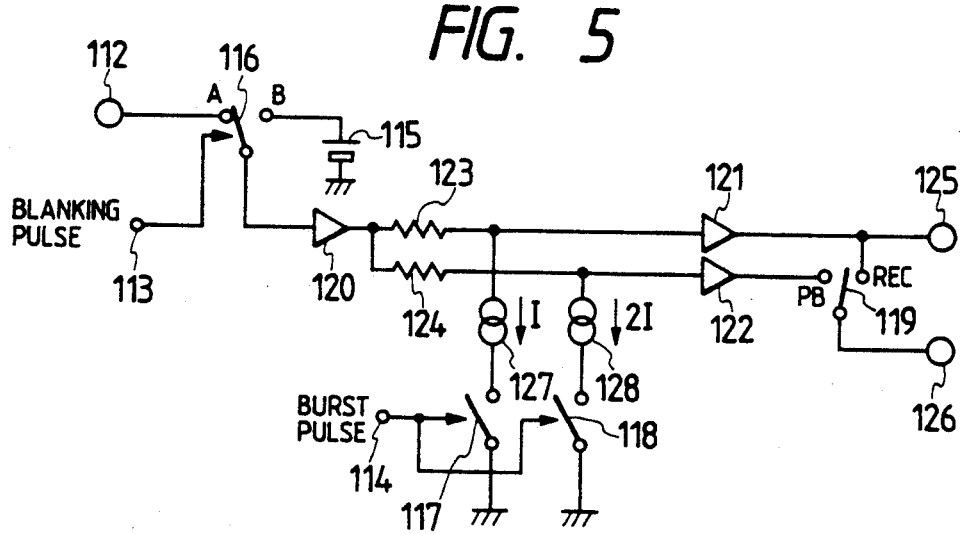
FIG. 5 is a block diagram showing one specific example of a burst level substituting circuit.

FIG. 5 is a block diagram showing one specific example of the burst level substituting circuit 44 of FIG. 1. Reference numerals 112 to 114 designate input terminals; numeral 115 a reference voltage source; numerals 116 to 119 switches; numerals 120 to 122 buffer amplifiers; numerals 123 and 124 resistors; numerals 125 and 126 output terminals; and numerals 127 and 128 current sources.

In FIG. 5: the color difference signal B-Y is inputted from the input terminal 112; the blanking pulse is inputted from the input terminal 113; and the burst pulse is inputted from the input terminal 114. For the period other than the blanking period, the switch 116 is closed to the A side so that the color difference signal B-Y inputted from the input terminal 112 is fed through the switch 116, the buffer amplifier 120, the resistor 123, the buffer amplifier 121 and the output terminal 125 to the switch 46 (shown in FIG. 1).

When the blanking pulse is inputted to the input terminal 113 for the blanking period of the color difference signal B-Y, the switch 116 is closed to the B side to connect the reference voltage source 11 with the buffer amplifier 120 so that the DC voltage at the correct pedestal level determined with the output voltage level of the reference voltage source 115 is obtained at the output terminal 125. When the burst pulse is inputted from the input terminal 114 for that blanking period, the switches 117 and 118 are closed so that the current having a value I is caused to flow from the reference voltage source 115 through the resistor 123 by the current source 127 whereas the current having a value 2I is caused to flow to the resistor 124 by the current source 128. The resistances of the resistors 123, 124 are equally set at R. The value I of the current flowing through the resistor 123 is so set that the output voltage of the buffer amplifier 121 may take the normal burst level. Since the resistance of the resistor 124 is equal to that of the resistor 123, the output voltage of the buffer amplifier 122 is equal to the level twice as high as the normal burst level, i.e., the level when the burst signal at the normal level is pre-emphasized by 6 dB by the burst pre-emphasis circuit 76 (shown in FIG. 1).

Thus, for either the recording or reproducing operation, the color difference signal B-Y having its pedestal and burst levels normally set is outputted to the output terminal 125 and fed to the PB side of the switch 46 (shown in FIG. 1). For the recording operation, on the other hand, the switch 119 is closed to the REC side so that the color difference signal B-Y outputted from the buffer amplifier 121 is fed from the output terminal 126 to the ACC detector 62 (shown in FIG. 1). For the reproducing operation, the switch 119 is closed to the PB side so that the color difference signal B-Y outputted from the buffer amplifier 122 and having a burst level twice as high as the normal level is fed from the output terminal 126 to the ACC detector 62.

The specific example of the burst level substituting circuit 43 shown in FIG. 1 is identical to that of FIG. 5, in the case of the PAL system, but can do without the input terminal 114, the switches 117 to 119, the buffer amplifier 122, the current sources 127 and 128 and the output terminal 126, in the case of the NTSC system, because no burst pulse is present in the color difference signal R-Y.

Figure 6B:
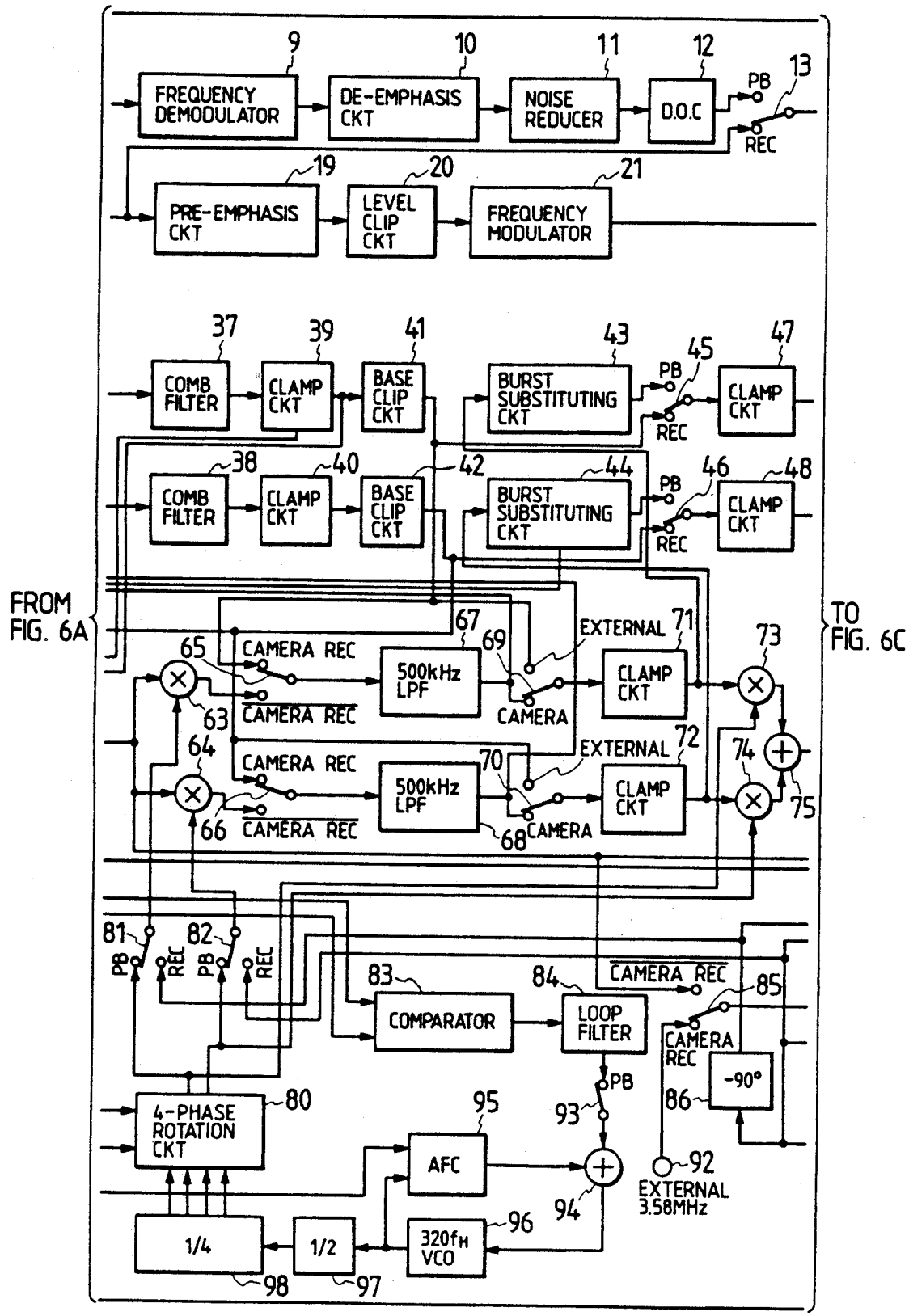
Figure 6C:
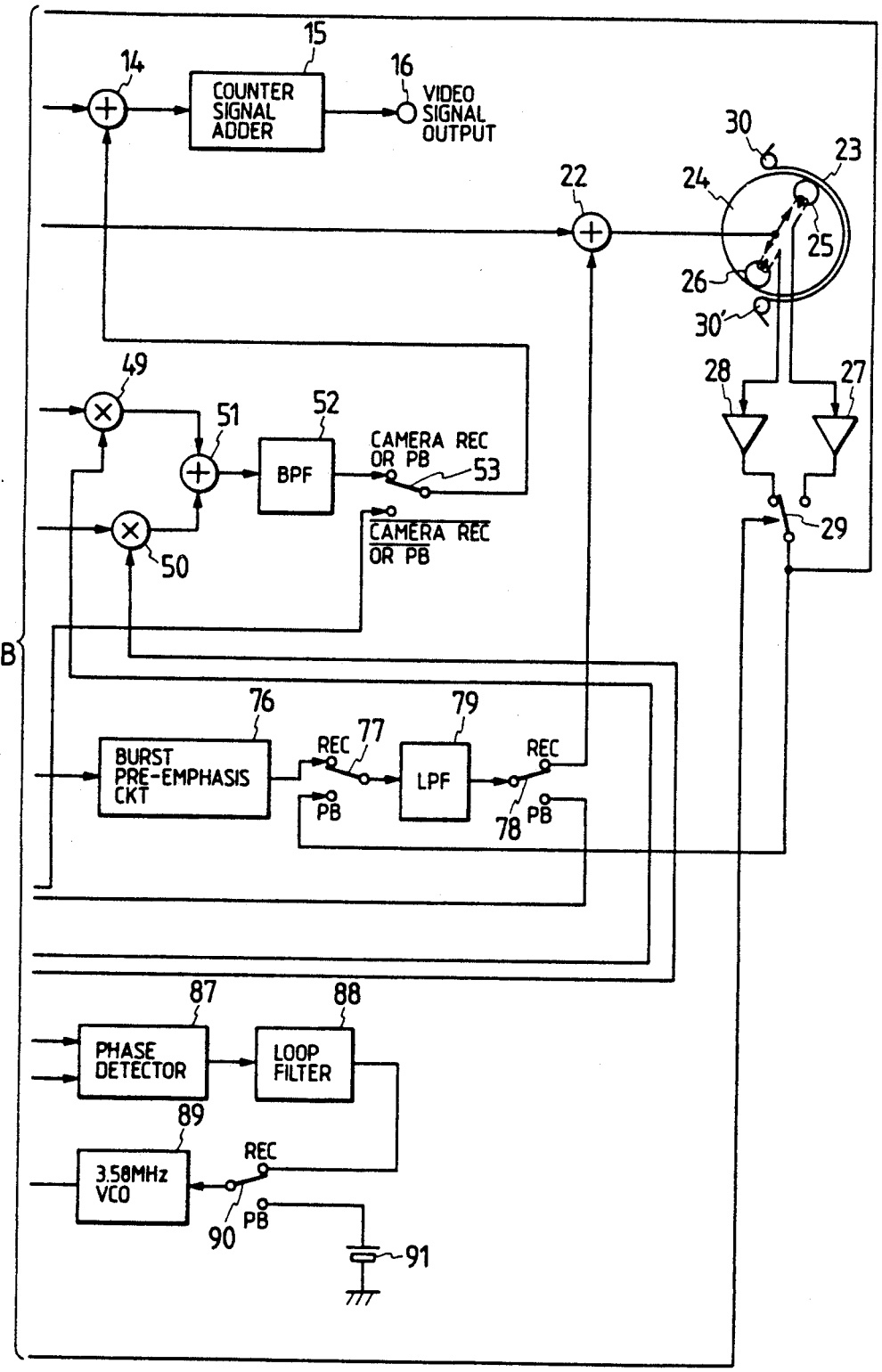

FIG. 6 is a block diagram showing another embodiment of the video signal recording and reproducing apparatus according to the present invention. The parts corresponding to those of FIG. 1 are designated at the common reference characters.

In the embodiment shown in FIG. 1, the color difference signals R-Y and B-Y in the base frequency band, which are to be outputted from the base clip circuits 41 and 42, are fed directly to the burst level substituting circuits 43 and 44, respectively. In the embodiment of FIG. 6, on the other hand, the switches 69 and 70 are individually closed to the "external" side for the reproducing operation so that the base clip circuits 41 and 42 are selected and so that the output signals of the clamp circuits 71 and 72 are fed to the burst level substituting circuits 43 and 44, too. For the reproducing operation, moreover, the color difference signals R-Y and B-Y outputted from the base clip circuits 41 and 42 are clamped by the clamp circuits 71 and 72, respectively, and are then fed to the burst level substituting circuits 43 and 44. The remaining structures and operations are similar to those of the embodiment shown in FIG. 1.

According to the present embodiment, for the reproducing operation, the color difference signals R-Y and B-Y are clamped to set the reference level constant. After this, the pedestal level and the burst level are substituted and set so that those level setting accuracies are improved.

Figure 7B:
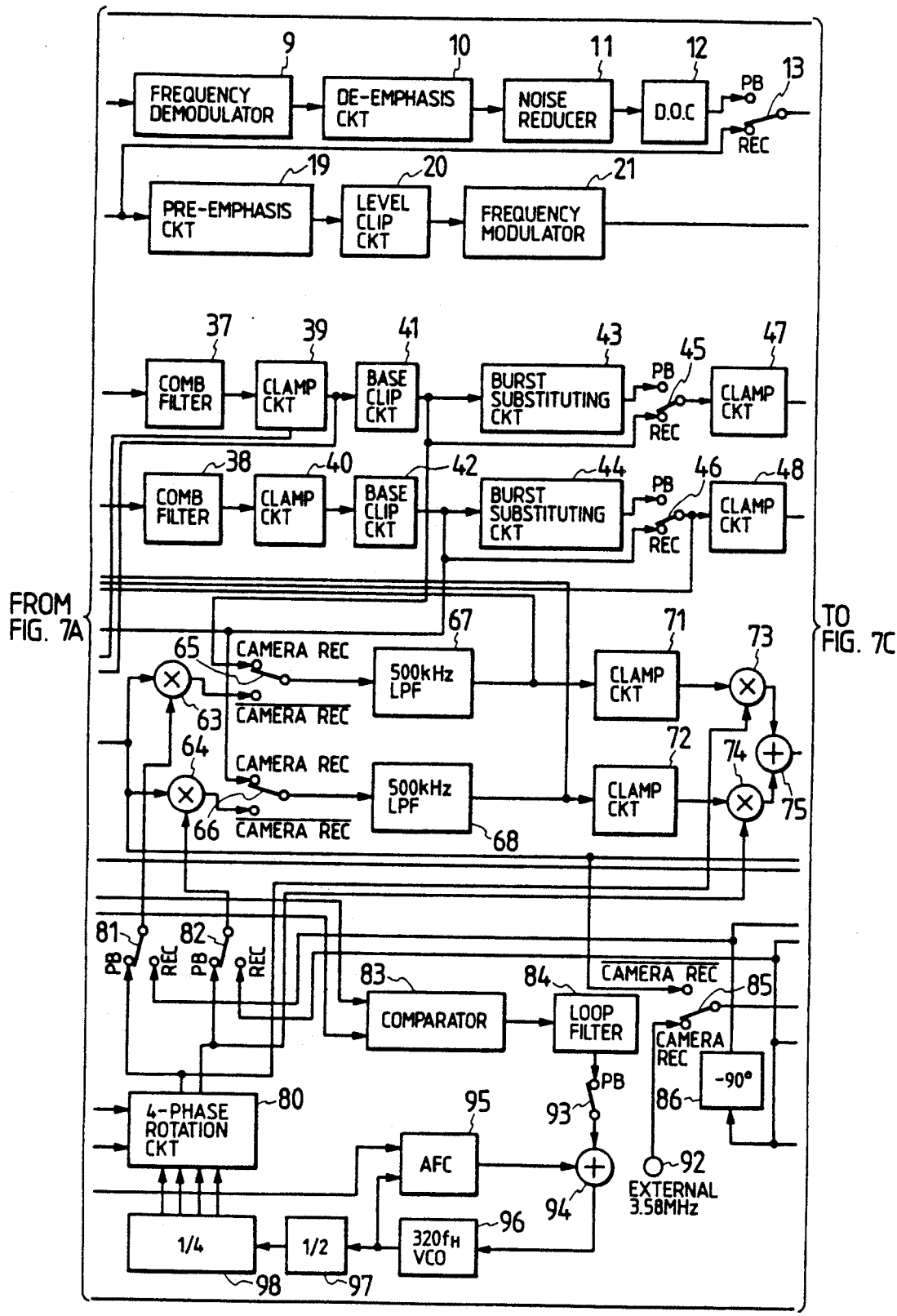
Figure 7C:
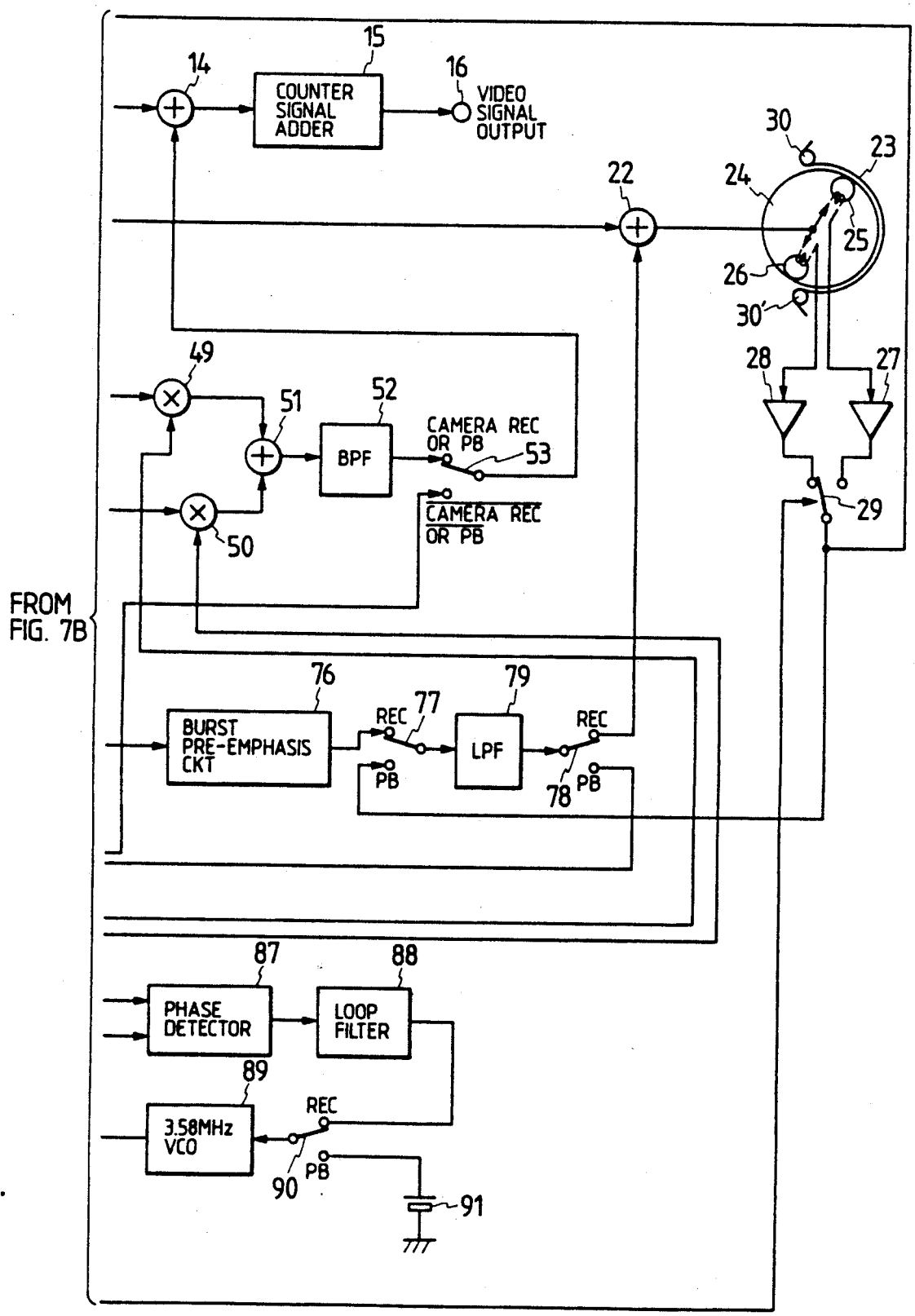

FIG. 7 is a block diagram showing still another embodiment of the video signal recording and reproducing apparatus according to the present invention. Reference numeral 44 designates a burst level substituting circuit, and numeral 129 designates a burst de-emphasis circuit. The parts corresponding to those of FIG. 1 are designated at the common reference characters.

This embodiment is different from that of FIG. 1: in that the burst de-emphasis circuit 129 is connected between the ACC amplifier 61 and the multipliers 63 and 64; and in that the switches 69 and 70 of FIG. 1 are eliminated so that the color difference signals R-Y and B-Y outputted from the LPFs 67 and 68 are fed to the switches 35 and 36 and subjected to the quadrature two-phase modulation through the clamp circuits 71 and 72 to form the down-converted chrominance signal.

The burst de-emphasis circuit 129 de-emphasizes the burst signal only for the reproducing operation and merely passes the chrominance signal C for the recording operation. For the reproducing operation, the burst pulse of the color difference signal B-Y outputted from the base clip circuit 42 is returned to its original level by the action of the burst de-emphasis circuit 129. The ACC detector 62 may compare the burst pulse of the color difference signal B-Y outputted from that base clip circuit 42 and the normal burst level set by a burst level substituting circuit 44. Therefore, the burst level substituting circuit 44 can do without the switches 118 and 119, the buffer amplifier 122, the resistor 124, the output terminal 126 and the current source 128 of FIG. 5, and the color difference signal B-Y outputted from the output terminal 125 may be fed to the ACC detector 62. Alternatively, the color difference signal B-Y outputted from the switch 46 downstream of the burst level substituting circuit 44 may be fed to the ACC detector 62, as shown in FIG. 7. In this case, the two input color difference signals B-Y of the ACC detector 62 are equal for the operation of recording the external color video signal so that the ACC amplifier 61 is set to have a constant gain.

In this embodiment, moreover, the individual color difference signals R-Y and B-Y to be recorded are not processed, for the operation of recording the external color video signal, by the comb filter and the base clip circuit, but these processings are accomplished for the monitoring operation so that the monitor can be in high picture quality.

Figure 8B:
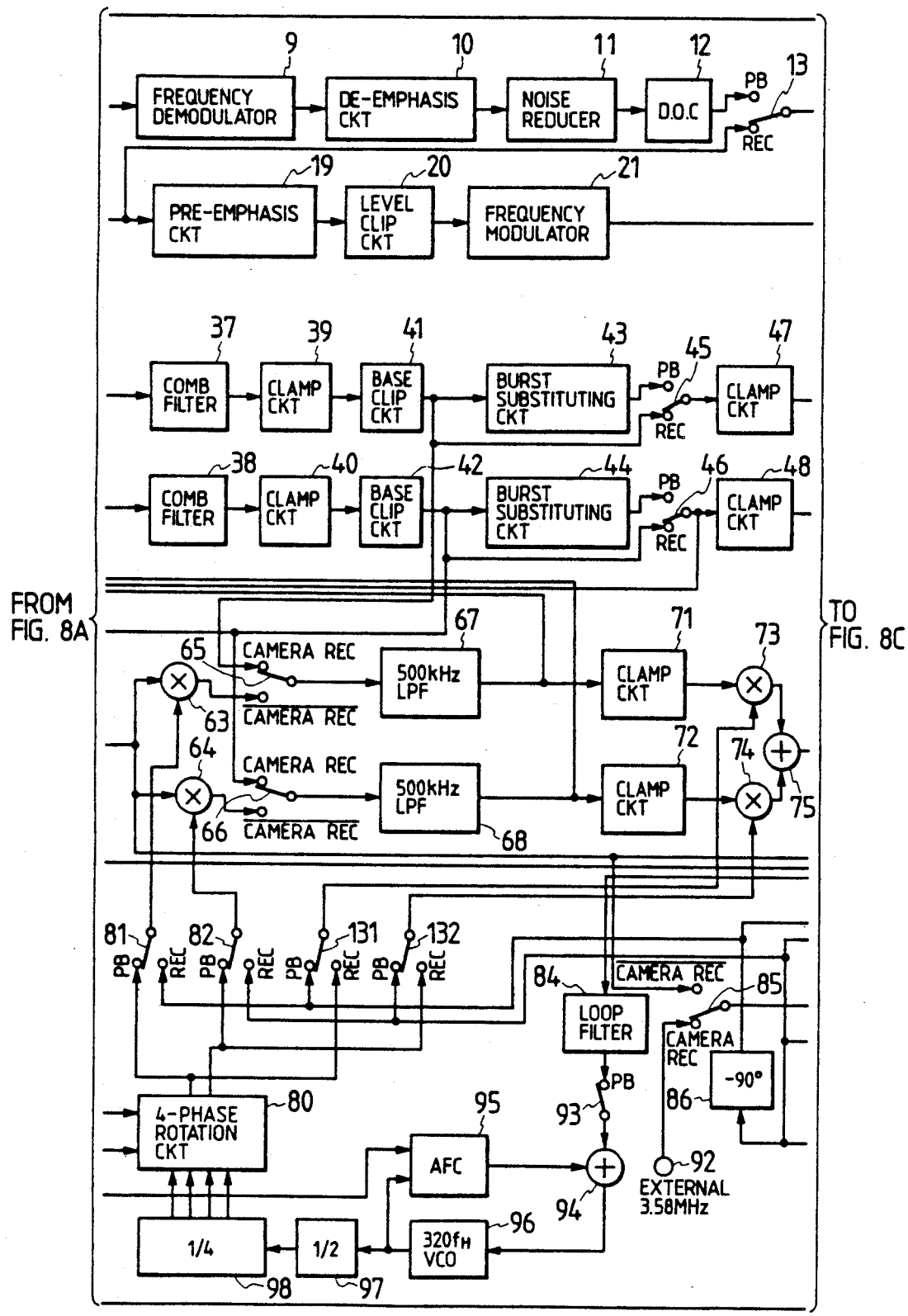
Figure 8C:
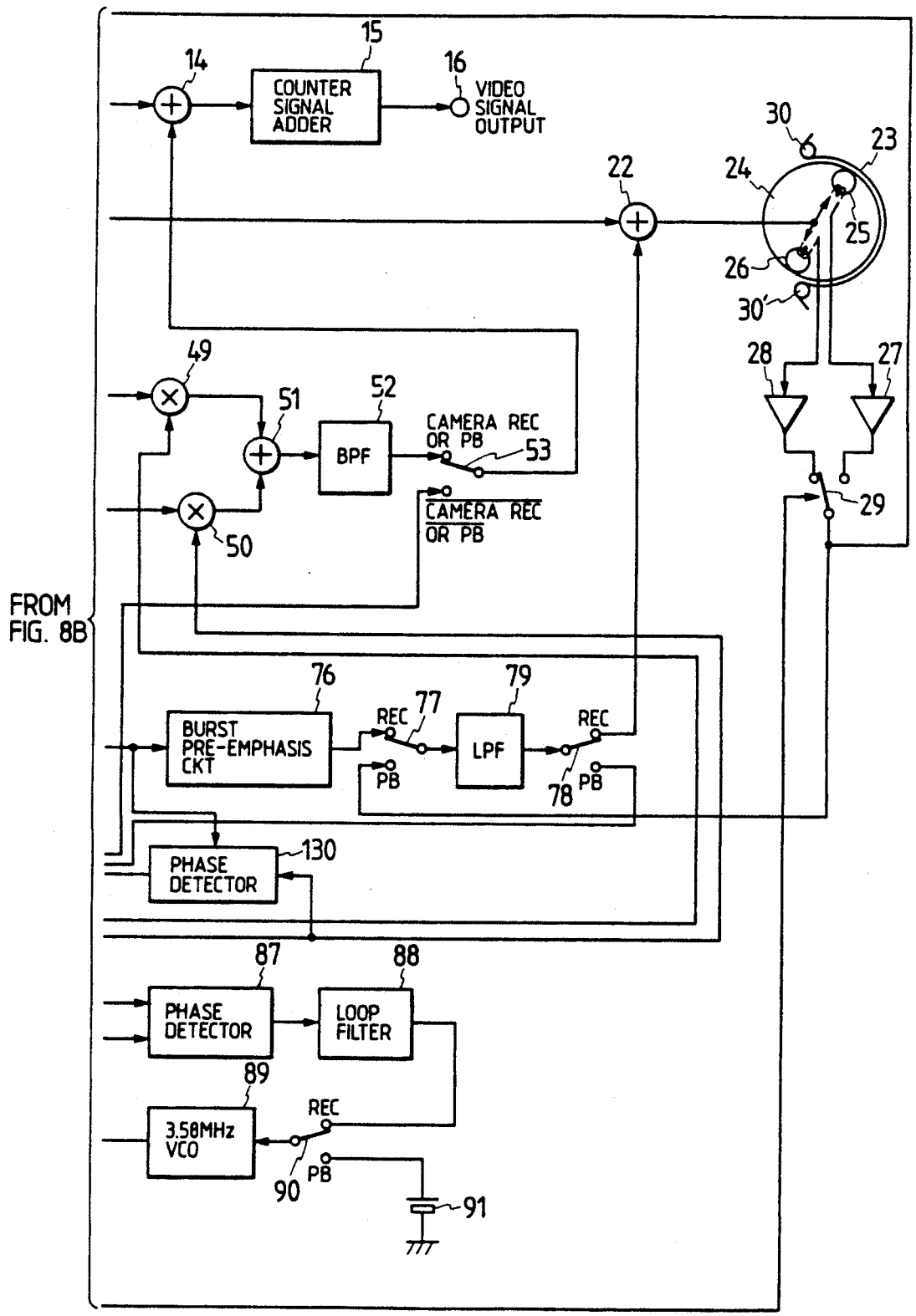

FIG. 8 is a block diagram showing a further embodiment of the video signal recording and reproducing apparatus according to the present invention. Reference numeral 130 designates a phase comparator, and numerals 131 and 132 designate switches. The parts corresponding to those of FIG. 7 are designated at the common reference characters.

In the embodiment shown in FIG. 7, for the reproducing operation, the level for the burst level and the pedestal level of the color difference signal R-Y in the base frequency band outputted from the clamp circuit 39 are compared in the 40 $f_H$ carrier generator by the comparator 83, the output signal of which is fed through the loop filter 84 to the VCO 96. Thus, the output phase of the VCO 96 is controlled to change the phase of the carrier wave for synchronously demodulating the reproduced down-converted chrominance signal, in response to the phase fluctuations contained in that down-converted chrominance signal.

In FIG. 8, on the contrary, the switches 131 and 132 are provided to feed, for the reproducing operation, the multipliers 74 and 73, respectively, with the carrier waves from the VCO 89 of the carrier generator of 3.58 MHz and the carrier wave from the 90° phase shifter 86. As a result, the chrominance signal of the carrier wave of 3.58 MHz is generated from the adder 75, and the burst signal of the chrominance signal and the output signal of the VCO 89 are phase-compared by the phase comparator 130 to detect the phase fluctuating components of the reproduced down-converted chrominance signal. These phase fluctuating components are fed in the 40 $f_H$ carrier generator through the loop filter 84 to the VCO 96 to control the output phase of the VCO 96.

The structures and operations of the remaining parts are similar to those of the embodiment shown in FIG. 7.

Incidentally, in the embodiments thus far described, the video signal of the NTSC system has been described, but it is apparent that the present invention could be applied to the video signal of another system.

In the individual embodiments thus far described, moreover, the D.O. compensator has been incorporated into the comb filters 37 and 38, as shown in FIGS. 2 to 4, but it may be provided separately of the comb filters 37 and 38.

As has been described hereinbefore, according to the present invention, when the color video signal is to be recorded and reproduced as the frequency-modulation luminance signal and as the chrominance signal converted into a lower frequency band, the color difference signals for forming said chrominance signal can be processed to improve the S/N ratio so that the picture quality of the reproduced image can be improved.

Figure 9:
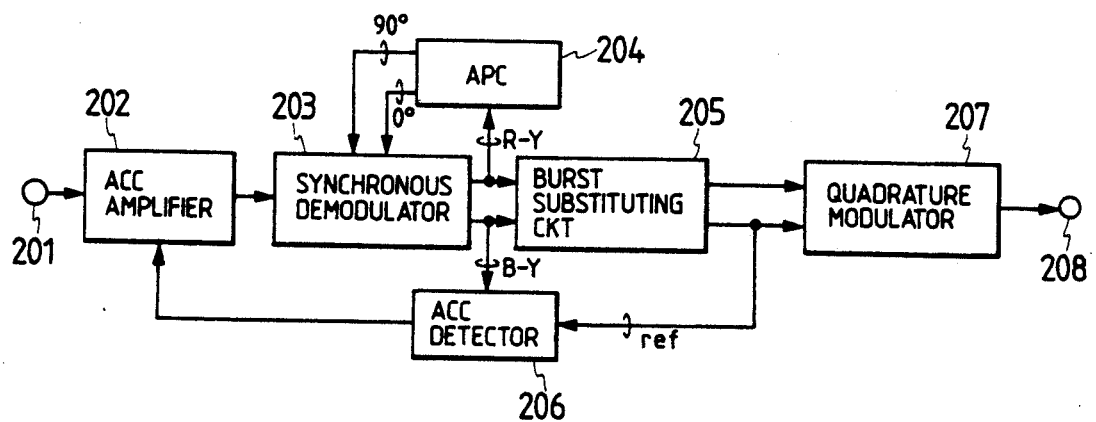
FIG. 9 is a block diagram showing one example of an automatic chrominance level control circuit to be suitably used in the video signal recording and reproducing apparatus according to the present invention.

FIG. 9 is a block diagram showing one example of the ACC (Automatic Chrominance level Control) circuit to be suitably used in the video signal recording and reproducing apparatus according to the present invention. Reference numeral 201 designates an input terminal; numeral 202 an ACC amplifier; numeral 203 a synchronous demodulator; numeral 204 an APC (Automatic Phase Control) circuit; numeral 205 a burst substituting circuit; numeral 206 an ACC detector; numeral 207 a quadrature two phase modulator; and numeral 208 an output terminal.

In FIG. 9, the chrominance signal inputted from the input terminal 201 has its level set constant by the ACC amplifier 202 and is then fed to the demodulator 203. The demodulator 203 is fed additionally with the sub-carrier wave in a phase of 0° and a sub-carrier wave in a phase of 90° from the APC circuit 204, by which the chrominance signal is demodulated to produce the color difference signals R-Y and B-Y in the base frequency band. For the blanking period of the color difference signal B-Y, there is present the burst pulse, i.e., the pulse having the envelope waveform of the demodulated burst signal of the chrominance signal. The color difference signal R-Y is fed to the APC circuit 204, and the phase of the sub-carrier wave is so controlled that the level of the color difference signal R-Y for the period corresponding to the burst signal in the blanking period may take a predetermined level. When the level of the period corresponding to the burst signal is at that predetermined level, the sub-carrier wave outputted from the APC circuit 204 is synchronized in frequency and phase with the sub-carrier wave of the chrominance signal so that the demodulator 203 correctly demodulates the chrominance signal.

The color difference signals R-Y and B-Y outputted from the demodulator 203 are burst-substututed (i.e., have their blanking signals and burst pulses substituted) by the burst substituting circuit 205, respectivley, and are fed to the modulator 207 so that the chrominance signal of quadrature two-phase modulation is fed to the terminal 208. (In the case of the NTSC system, the blanking signal of the color difference signal R-Y is merely substituted because the color difference signal R-Y has no burst pulse).

In the ACC detector 206, on the other hand, the burst pulse of the color difference signal B-Y inputted to the burst substituting circuit 205 and the burst pulse of the color difference signal B-Y outputted from the burst substituting circuit 205 are compared in level with each other so that a signal according to the level difference is detected as a control signal. In accordance with this control signal, the gain of the ACC amplifier 202 is controlled. In this case, the gain of the ACC amplifier 202 is so controlled that the burst pulse level of the input color difference signal B-Y of the burst substituting circuit 205 may be equal to the burst pulse level of the output color difference signal of the burst substituting circuit 205.

Since the color difference signals R-Y and B-Y in the base frequency band are present between the demodulator 203 and the burst substituting circuit 205, they can be processed inbetween for noise reductions with the comb filters. In the case of these signal processings, the color difference signal B-Y to be inputted to the burst substituting circuit 205 after those signal processings is fed to the ACC detector 206.

As has been described above, according to this example, the ACC amplifier 202 operates to equalize the levels of the input/output burst pulses of the burst substituting circuit 205 so that the dispersion in the offset and gain due to the processing circuits between the ACC amplifier 202 and the burst substituting circuit 205 can be absorbed to effect the correct burst substitutions. Thus, the chrominance signal outputted from the modulator 207 contains the curst signal which has correct amplitude and phase with respect to the color signal components and a square envelope. As a result, a picture in excellent color reproductivity is displayed on the screen of the monitor.

Figure 10:
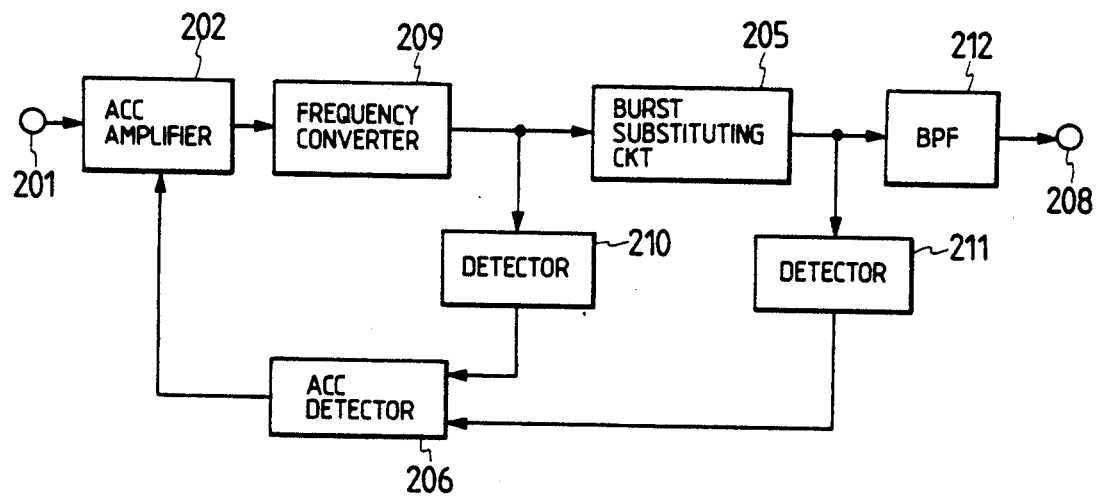
FIGS. 10, 11 and 12 are block diagrams showing other examples of the automatic chrominance level control circuit, respectivley.

FIG. 10 is a block diagram showing another example of the ACC circuit. Reference numeral 209 designates a frequency converter; numerals 210 and 211 detectors; and numeral 212 a BPF. The parts corresponding to those of FIG. 9 are designated at the common reference numerals.

In the preceding example shown in FIG. 9, the color difference signals in the base frequency band are burst-substituted. In this example shown in FIG. 10, the chrominance signal is burst-substituted.

In FIG. 10, a down-converted chrominance signal reproduced from the magnetic recording medium is inputted from the input terminal 201 and has its level set constant by the ACC amplifier 202. After this, the chrominance signal is converted into a signal in a higher frequency band to restore its original frequency band. This chrominance signal is burst-substituted (i.e., has its blanking signal and burst signal substituted) by the burst substituting circuit 205 and is then cleared of the unnecessary components by the BPF 202 until it is outputted from the output terminal 208.

On the other hand, the input and output chrominance signals of the burst substituting circuit 205 are detected by the detectors 210 and 211, respectively. The levels of the burst signals of those detected output signals are compared by the ACC detector 206 so that the signal according to the level difference is fed as a gain control signal to the ACC amplifier 202.

Thus, in this second example, too, the gain of the ACC amplifier 205 is so controlled that the level of the input burst signal of the burst substituting circuit 205 may be equal to the level of the output burst signal of the burst substituting circuit 205. As a result, the dispersion in the offset or gain due to the processing circuits between the ACC amplifier 202 and the burst substituting circuit 205 is absorbed.

Incidentally, in FIG. 10, the BPF 212 may be disposed downstream of the frequency converter 209 to achieve similar effects.

Figure 11:
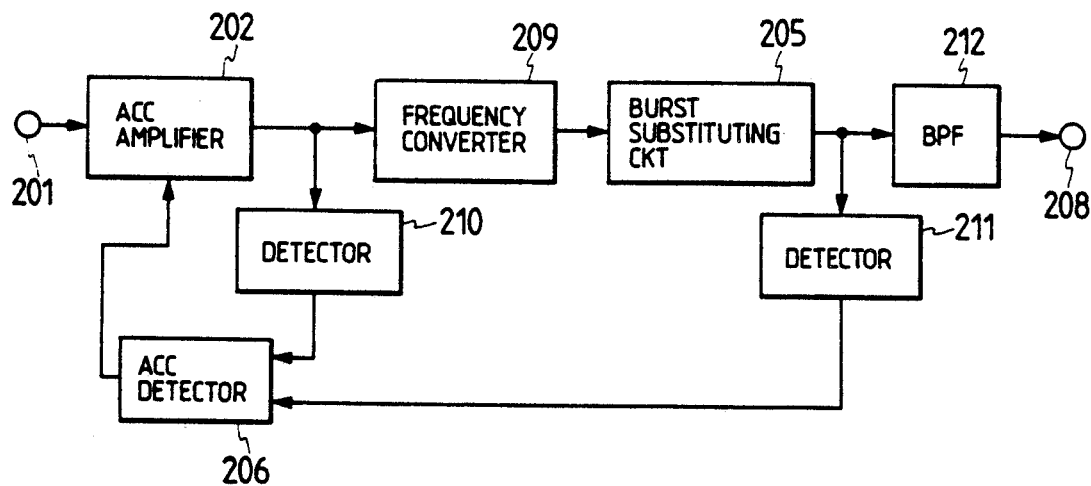

FIG. 11 is a block diagram showing still another example of the ACC circuit. The parts corresponding to those of FIG. 10 are designated at the common reference numerals.

In this example, the chrominance signal to be inputted to the frequency converter 209 is detected by the detector 210 and fed to the ACC detector 206. The remaining parts are similar to those of the example shown in FIG. 10.

Figure 12:
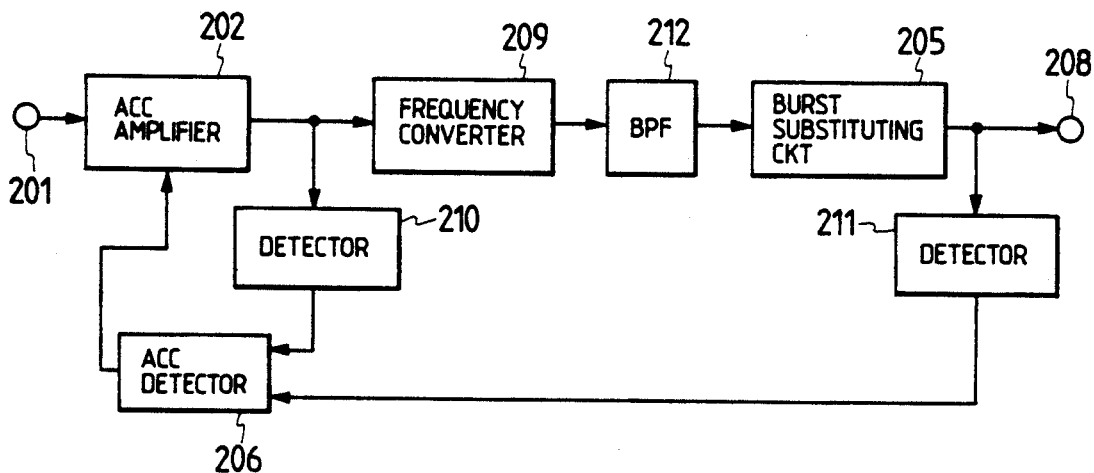

In FIG. 11, moreover, the BPF 212 is disposed downstream of the burst substituting circuit 205 but may be interposed between the frequency converter 209 and the burst substituting circuit 205, as shown in FIG. 12.

As has been described above, the reference signal of the ACC detector 206 can be obtained from the burst substituting circuit 205 without any special reference signal generator, and the reference voltage source disposed in the ACC detector 206 can be omitted from the prior art.

If, moreover, the reference signal is to be obtained from the burst substituting circuit 206, its level can be absolutely equal to the burst level of the chrominance signal produced by the burst substitution. In case the reference signal generator is separately provided, the resultant reference signal level is seriously difficult to be equal to the burst level of the burst-substituted chrominance signal.

Figure 13:
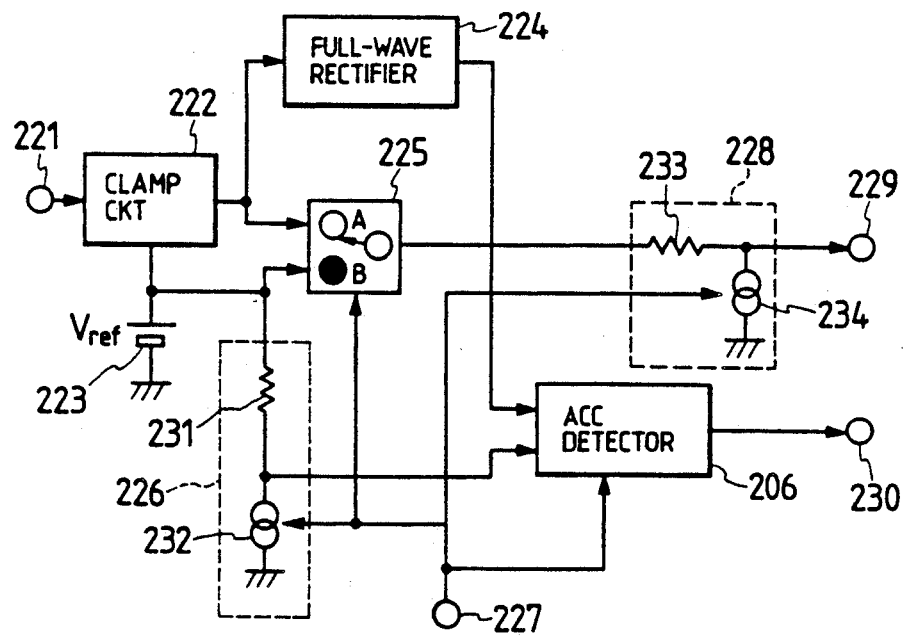
FIGS. 13, 14, 15 and 16 are block diagrams showing specific examples of the burst substituting circuit of FIG. 9, respectivley.

FIG. 13 is a block diagram showing one specific example of the burst substituting circuit 205 of FIG. 9. Reference numeral 221 designates an input terminal; numeral 222 a clamp circuit; numeral 223 a reference voltage source; numeral 224 a full-wave rectifier; numeral 225 a switch; numeral 226 a reference signal generator; numeral 227 an input terminal; numeral 228 a burst adder; numerals 229 and 230 output terminals; numeral 231 a resistor; numeral 232 a constant current source; numeral 233 a resistor; and numeral 234 a constant current source.

In FIG. 13, the color difference signal B-Y in the base frequency band is inputted from the input terminal 221. This color difference signal B-Y is fed to the clamp circuit 222 and keyed-clamped for the blanking period at the reference voltage $V_{ref}$ of the reference voltage source 223. The switch 225 is closed to the A side for the period other than the burst signal period so that the clamped color difference signal B-Y is fed through the switch 225 and outputted through the resistor 233 of the burst adder 228 from the output terminal 229. At this time, the constant current source 234 of the burst adder 228 is inoperative.

For the burst signal period, the burst gate pulse is inputted from the input terminal 227 so that the switch 225 is switched to the B side and so that the constant current source 234 of the burst adder 228 and the constant current source 232 of the reference signal generator 226 are rendered operative. Thus, the reference voltage $V_{ref}$ of the reference voltage source 223 is impressed through the switch 225 upon the burst adder 228 composed of the resistor 233 and the constant current source 234. The output terminal 229 is connected with the node between that resistor 233 and the constant current source 234 so that the output terminal 229 obtains a voltage lower than the reference voltage $V_{ref}$ by a voltage drop at the resistor 233 due to the constant current determined by the constant current source 234. Here, since the reference voltage $V_{ref}$ is equal to the blanking level of the color difference signal B-Y by the clamp circuit 222, the square burst pulse having an amplitude equal to the voltage drop at the resistor 233 is added for the blanking period of the color difference signal.

On the other hand, the reference voltage $V_{ref}$ is also added to the reference signal generator 226, in which the resistor 231 and the constant current source 232 are connected in series, and the constant current source 232 operates for the period in which the burst gate pulse is inputted from the input terminal 227, so that the voltage obtained at the node between the constant current source 232 and the resistor 231 is fed as the reference signal to the ACC detector 206. This reference signal is at a voltage lower than the reference voltage $V_{ref}$ by the voltage drop at the resistor 231 due to the constant current determined by the constant current source 232. On the other hand, the output signal of the clamp circuit 222 is rectified by the full-wave rectifier 224 and then fed to the ACC detector 206. This ACC detector 206 compares the levels of those two input signals for the period in which the burst gate pulse is inputted from the input terminal 227, and feeds the gain control signal according to the level difference from the output terminal 230 to the ACC amplifier 202.

For the input period of that burst gate pulse, the output signal of the clamp circuit 222 is the burst pulse of the color difference signal B-Y. This color difference signal B-Y is clamped at the reference voltage $V_{ref}$, and the reference signal fed from the reference signal generator 226 to the ACC detector 206 is at the voltage using the reference voltage $V_{ref}$ as the reference level. As a result, in the ACC detector 206, the levels of the burst pulse of the color difference signal B-Y and the reference signal, which have the common reference level, are compared. However, the burst pulse to be fed to the ACC detector 206 is caused to have the same polarity as that of the reference signal with respect to that reference level by the full-wave rectifier 224. In the reference signal generator 226, moreover, the resistance of the resistor 231 is set at the resistance of the resistor 233 of the burst adder 228, and the current value of the constant current source 232 is set at the current value of the constant current source 234. Thus, the reference signal generator 226 and the burst adder 228 have the common structure and are fed with the common reference voltage $V_{ref}$ so that the reference signal to be fed from the reference signal generator 226 to the ACC detector 206 takes the same level as that of the burst pulse to be added from the burst adder 228. Thus, in the ACC detector 206, the level of the burst pulse of the color difference signal B-Y outputted from the clamp circuit 222 is substantially compared with the level of the burst pulse added by the burst adder 228.

Incidentally, the switch 225 is more or less offset but has a common offset no matter whether it might be closed to the A or B side. Moreover, the color difference signal B-Y fed to the A side is clamped at the reference voltage $V_{ref}$ of the reference voltage source 223, and the reference voltage $V_{ref}$ is fed to the B side. As a result, the reference level to be outputted remains constant, even if the switch 225 is switched, to establish no offset. In this case, the level of the burst pulse added by the burst adder 228 is difference by the offset of the switch 225 from the level of the reference signal outputted from the reference signal generator 226. However, the amplitude of that burst pulse is equal to the voltage drop from the reference voltage $V_{ref}$ of the reference signal.

Since, moreover, neither the burst pulse of the color difference signal B-Y nor the reference signal fed to the ACC detector 206 passes through the switch 225, they are not influenced by the offset of the switch 225, accordingly they can be compared with the common reference level.

Figure 14:
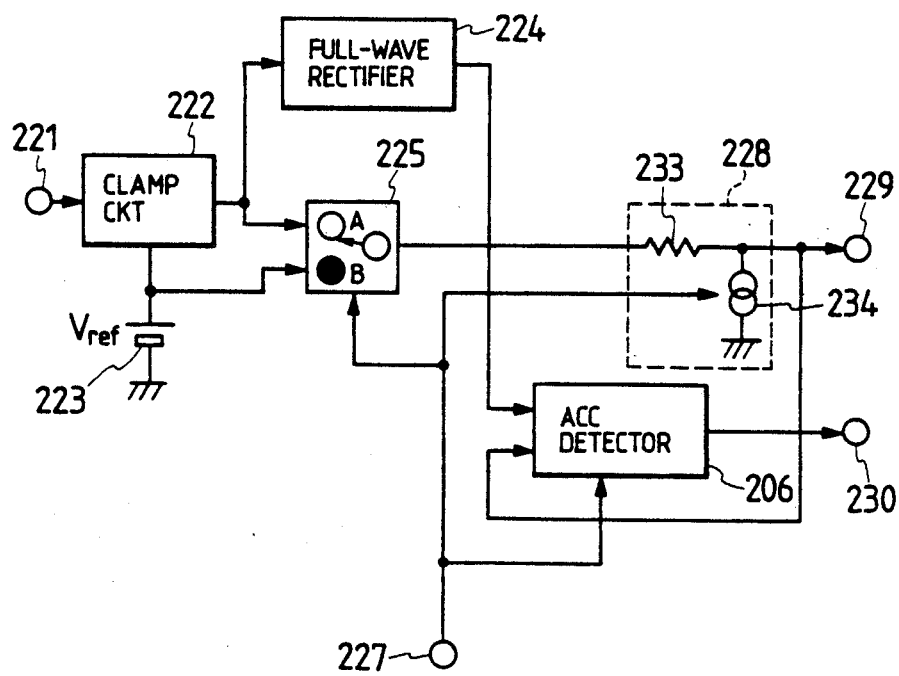

FIG. 14 is a block diagram showing another specific example of the burst substituting circuit 205 of FIG. 9. The parts corresponding to those of FIG. 13 are designated at the common reference numerals.

In the example shown in FIG. 13, special provision is made of the reference signal generator 226 for the ACC detector 206. In the specific example shown in FIG. 14, on the contrary, the reference signal for the ACC detector 206 is obtained from the burst adder 228.

In FIG. 14, the ACC detector 206 is fed with both the output signal of the full-wave rectifier 224 and the output signal of the burst adder 228. For the period in which the burst gate pulse is inputted to the input terminal 227, the ACC detector 206 compares the levels of the burst pulse of the color difference signal B-Y outputted from the clamp circuit 222 and the added burst pulse of the color difference signal B-Y outputted from the burst adder 228, to produce the gain control signal of the ACC amplifier.

Here, the reference levels of the color difference signal B-Y outputted from the clamp circuit 222 and the color difference signal B-Y outputted from the burst adder 228 are different by the offset of the switch 225, which is so remarkably small that this example is effective because its circuit structure can be simplified, provided that the offset is not put into account.

Figure 15:
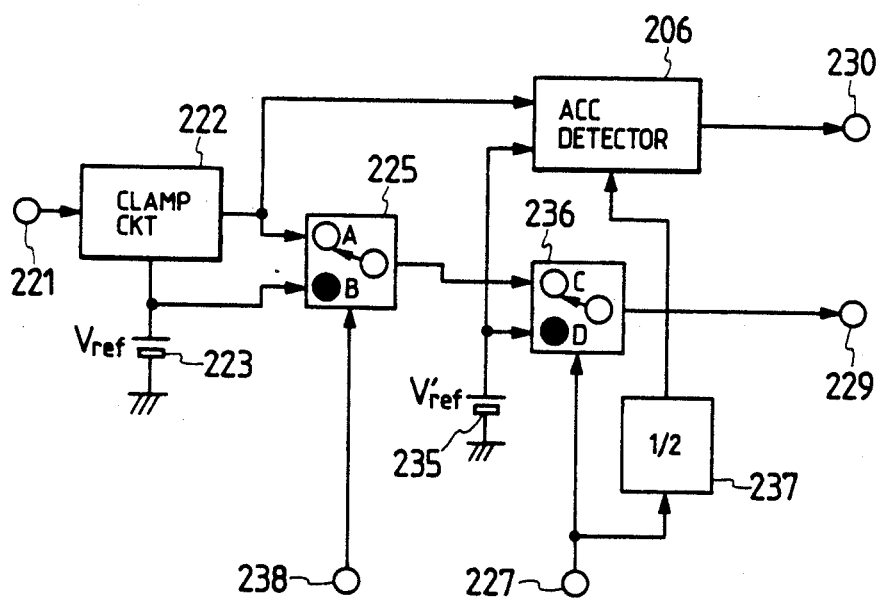

FIG. 15 is a block diagram showing still another specific example of the burst substituting circuit 205 of FIG. 9. Reference numeral 235 designates a reference voltage source; numeral 236 a switch; numeral 237 a ½ counter; and numeral 238 an input terminal. The parts corresponding to those of FIG. 13 are designated at the common reference numerals.

This specific example is effective especially for the color difference signals of the PAL system. In the color difference signals of the PAL system in the base frequency band, the burst pulse has its polarity inverted for each 1H period. In the specific examples of FIGS. 13 and 14, the polarities of these burst pulses can be arranged by the full-wave rectifier 224. In the specific example shown in FIG. 15, however, every other burst pulses in the same polarity is extracted from the input color difference signal by the burst gate pulses, and these burst pulses are used to produce the gain control signal of the ACC amplifier.

The operations of this specific example will be described in the following with reference to the timing chart of FIG. 17.

Figure 17:
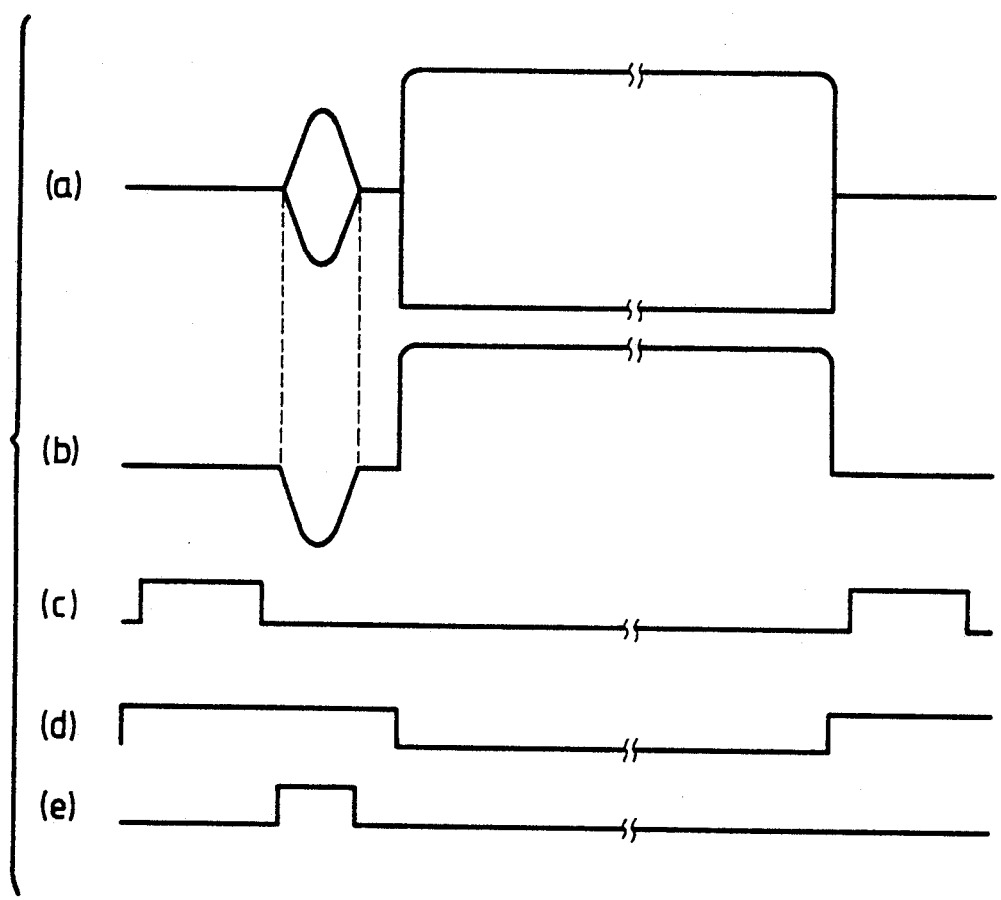
FIG. 17 consisting of (a)-e, are timing charts for explaining the operations of the burst substituting circuit of FIG. 16.

The color difference signal B-Y (shown at (b) in FIG. 17) in the base frequency band, which is obtained by demodulating the reproduced chrominance signal (shown at (a) in FIG. 17), is fed from the input terminal 221 to the clamp circuit 222 and keyed-clamped at the reference voltage $V_{ref}$ of the reference voltage source 223 for the blanking period in response to the clamp pulse (shown at (c) in FIG. 17).

For the period other than the blanking period of the color difference signal B-Y, the switches 225 and 236 are closed to the A and C sides, respectively, so that the color difference signal B-Y outputted from the clamp circuit 222 is outputted through the switches 225 and 236 from the output terminal 229.

For the blanking period of the color difference signal B-Y, on the other hand, the blanking pulse (shown at (d) in FIG. 17) is inputted from the input terminal 238 so that the switch 225 is switched to the B side. Thus, the reference voltage $V_{ref}$ of the reference voltage source 223 is outputted through the switches 225 and 236 from the output terminal 229. In other words, the substitution by the reference voltage $V_{ref}$ is done for the blanking period of the color difference signal B-Y. As a result, the noises such as the transient pulse, if any, for the blanking period are reduced.

For the burst signal period in that blanking period, the burst gate pulse (shown at (e) in FIG. 17) is inputted from the input terminal 227 to switch the switch 236 to the D side so that the reference voltage $V'_{ref}$ of the reference voltage source 235 is outputted through the switch 236 from the output terminal 229. As a result, the square burst pulse having the level $V'_{ref}$ is added for the blanking period.

On the other hand, the ACC detector 206 is fed with both the color difference signal B-Y outputted from the clamp circuit 222 and the reference voltage $V'_{ref}$ of the reference voltage source 235. Moreover, the burst gate pulse (shown at (e) in FIG. 17) inputted from the input terminal 227 is fed to the ½ counter 237 to produce the burst gate pulse of a 2H period, which is fed to the ACC detector 206. This ACC detector 206 compares the levels of the two input signals for that burst gate pulse period. As a result, every other burst pulses of the color difference signal B-Y outputted from the clamp circuit 222 are compared in level with the reference voltage $V'_{ref}$. In this case, by controlling the ½ counter 237 with the vertical synchronizing signal, the burst pulses to have its level compared in the ACC detector 206 are arranged in the burst pulses of the same polarity as that of the reference voltage $V'_{ref}$ with respect to the reference level of the reference voltage $V_{ref}$.

Figure 16:
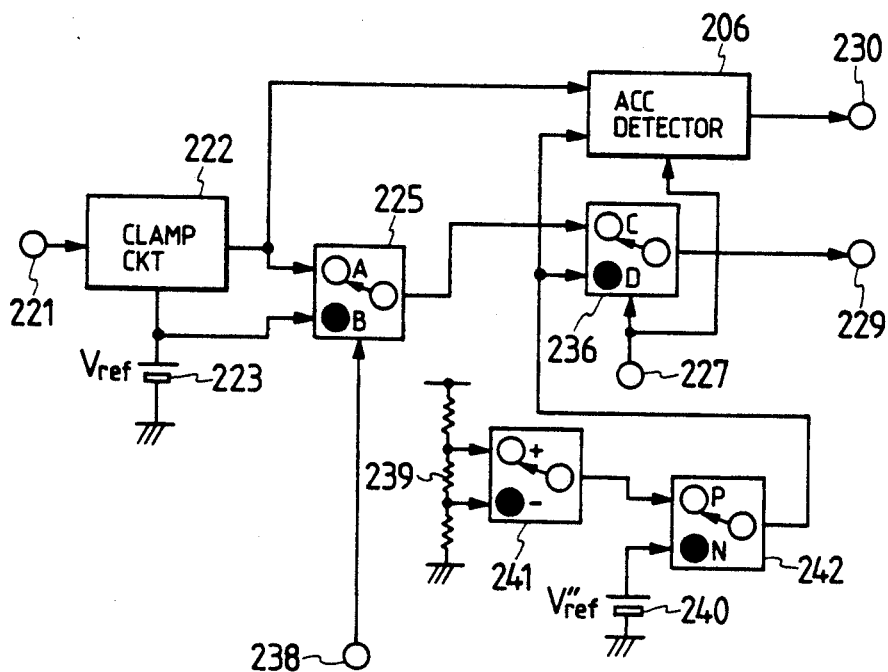

FIG. 16 is a block diagram showing still another specific example of the burst substituting circuit 205 of FIG. 9. Reference numerals 239 and 240 designate reference voltage sources, and numerals 241 and 242 designate switches. The parts corresponding to those of FIG. 15 are designated at the common reference numerals.

This specific example is enabled to correspond to the PAL system and the NTSC system. In the case of the PAL system, too, each burst pulse has its level compared by the ACC detector.

In FIG. 16, the clamp circuit 222 and the switches 225 and 236 perform the same operations as those of the specific example shown in FIG. 15, but the ACC detector 206 performs its comparing operation each time the burst gate pulse is inputted to the input terminal 227.

In the case of the NTSC system, the switch 242 is closed to the N side so that the reference voltage $V''_{ref}$ of the reference voltage source 240 is fed through the switch 242 to the D side of the switch 236 and the ACC detector 206. If the burst gate pulse is inputted to the input terminal 227, the switch 236 is switched to the D side to add the square burst pulse at the level of the reference voltage $V''_{ref}$ so that the levels of the burst pulse of the color difference signal B-Y from the clamp circuit 222 and the reference voltage V"$_{ref}$ are compared by the ACC detector 206.

In the case of the PAL system, the switch 242 is closed to the P side, and the switch 241 is alternately switched between plus and minus sides for each 1H period. The reference voltage source 239 generates the reference voltages in positive and negative polarities with respect to the reference voltage V$_{ref}$, which are alternately selected for each 1H period by the switch 241. The reference voltage outputted from the switch 241 is fed through the switch 242 to the D side of the switch 236 and the ACC detector 206 to add the burst pulse having its polarity inverted for each 1H period and to produce the gain control signal like the case of the NTSC system. In this case, the switching phase of the switch 241 is so controlled with the vertical synchronizing signal, for example, that the reference voltage fed to the ACC detector 206 from the switch 241 and the burst pulse from the clamp circuit 222 may take a common polarity with respect to the reference level of the referene voltage V$_{ref}$. Although the specific examples of the burst substituting circuit of the color difference signal B-Y has been described hereinbefore, the burst substituting circuit of the color difference signal R-Y can take a similar structure. However, this burst substituting circuit can do without the reference signal generator for the ACC detector. In the case of the NTSC system, moreover, the burst pulse adder can also be dispensed with.

In the specific examples of FIGS. 13 and 14, moreover, the switch 225 can be controlled with the blanking pulse so that the blanking period may be substituted by the reference voltage V$_{ref}$.

In FIGS. 13 and 14, moreover, the case of the NTSC system may do without the full-wave rectifier 224.

Incidentally, the burst substituting circuit 205 of FIGS. 10 to 12 can take the structures similar to those of FIGS. 15 and 16. Here, the reference voltage sources 235, 239 and 240 should naturally be replaced by the APC circuit for generating the sub-carrier wave which is synchronized in phase with the burst signal of the input chrominance signal of a predetermined amplitude.

As has been described hereinbefore, according to the aforementioned examples of the ACC circuit, the automatic chrominance control is accomplished such that the input/output burst levels of the burst substituting circuit may be equal. As a result, the level and amplitude of the burst signal of the burst-substituted chrominance signal can be optimized with neither being influenced by the dispersion in the offset and gain of the processing circuits between the ACC circuit and the burst substituting circuit nor adding any special circuit so that the color reproductivity can be improved.

We claim:

1. A video signal recording and reproducing apparatus for frequency-multiplexing both a signal frequency-modulated with a luminance signal and a down-converted chrominance signal, and recording and reproducing them, comprising:

first carrier generating means for generating a first carrier wave having a frequency lower than that of a color subcarrier of a color video signal;

second carrier generating means for generating a second carrier wave having a frequency equal to that of said color subcarrier of the color video signal;

first modulating means for modulating said first carrier wave with at least one color difference signal which is in a base frequency band and to be recorded, so as to generate a recording down-converted chrominance signal;

demodulating means for demodulating a reproduced down-converted chrominance signal so as to output at least one color difference signal in the base frequency band;

signal processing means for subjecting said at least one color difference signal outputted from said demodulating means to a predetermined processing for improvement of picture quality; and second modulating means for modulating said second carrier wave with said at least one color difference signal outputted from said signal processing means so as to generate a chrominance signal of a color video signal.

2. A video signal recording and reproducing apparatus combined with a video camera for frequency-multiplexing both a signal frequency-modulated with a luminance signal and a down-converted chrominance signal, and recording and reproducing them, comprising:

first switching means for selecting a chrominance signal in a color video signal fed from the outside, when in a recording mode for recording said color video signal, and a reproduced down-converted chrominance signal when in a reproducing mode;

demodulating means for demodulating said chrominance signal or said down-converted chrominance signal selected by said first switch means so as to output first and second color difference signals;

second switching means for selecting either of a group of said first and second color difference signals or a group of third and fourth color difference signals which are fed from said video camera and to be recorded;

processing means for subjecting the color difference signals selected by said second switching means to a predetermined processing for improvement of picture quality;

first modulating means for modulating a carrier wave having a frequency lower than that of a color subcarrier of a color video signal with the color difference signals outputted from said signal processing means, so as to generate a down-converted chrominance signal; and second modulating means for modulating a carrier wave having a frequency equal to that of said color subcarrier of the color video signal with the color difference signals outputted from said signal processing means, so as to generate a chrominance signal of a color video signal.

3. A video signal recording and reproducing apparatus combined with a video camera for frequency-multiplexing both a signal frequency-modulated with a luminance signal and a down-converted chrominance signal, and recording and reproducing them, comprising:

first switching means for selecting a chrominance signal in a color video signal fed from the outside, when in a recording mode for recording said color video signal, and a reproduced down-converted chrominance signal when in a reproducing mode;

demodulating means for demodulating said chrominance signal or said down-converted chrominance signal selected by said first switch means so as to output first and second color difference signals;

second switching means for selecting either of a group of said first and second color difference signals or a group of third and fourth color difference signals which are fed from said video camera and to be recorded;

processing means for subjecting the color difference signals selected by said second switching means to a predetermined processing for improvement of picture quality;

first modulating means for modulating a carrier wave having a frequency lower than that of a color subcarrier of a color video signal with either of the group of said color difference signals outputted from said signal processing means or the group of said color difference signals outputted from said demodulating means, so as to generate a down-converted chrominance signal; and second modulating means for modulating a carrier wave having a frequency equal to that of said color subcarrier of the color video signal with the color difference signals outputted from said signal processing means, to generate a chrominance signal of a color video signal.

4. An apparatus according to claim 1, wherein said signal processing means includes means for compensating the dropout of said at least one color difference signal.

5. An apparatus according to claim 2, wherein said signal processing means includes means for compensating the dropout of said color difference signals.

6. An apparatus according to claim 3, wherein said signal processing means includes means for compensating the dropout of said color difference signals.

7. An apparatus according to claim 1, wherein said signal processing means includes a comb filter for reducing interleaved noises from said at least one color difference signal.

8. An apparatus according to claim 2, wherein said signal processing means includes comb filters for reducing interleaved noises from said color difference signals, respectively.

9. An apparatus according to claim 3, wherein said signal processing means includes comb filters for reducing interleaved noises from said color difference signals, respectively.

10. An apparatus according to claim 7, wherein said comb filter includes:

a switch for selecting either of an input color difference signal to be inputted to said comb filter or an output color difference signal outputted from said comb filter;

a delay circuit for delaying the color difference signal selected by said switch, for one horizontal scanning period; and an adder for adding the color difference signal delayed by said delay circuit to the color difference signal selected by said switch, and outputting the added result as said output color difference signal to be outputted from said comb filter, whereby said switch selects said output color difference signal for the dropout period of said input color difference signal so as to compensate said dropout.

11. An apparatus according to claim 8, wherein each of said comb filters includes:

a switch for selecting either of an input color difference signal to be inputted to said comb filter or an output color difference signal outputted from said comb filter;

a delay circuit for delaying the color difference signal selected by said switch, for one horizontal scanning period; and an adder for adding the color difference signal delayed by said delay circuit to the color difference signal selected by said switch, and outputting the added result as said output color difference signal to be outputted from said comb filter, whereby said switch selects said output color difference signal for the dropout period of said input color difference signal so as to compensate said dropout.

12. An apparatus according to claim 9, wherein each of said comb filters includes:

a switch for selecting either of an input color difference signal to be inputted to said comb filter or an output color difference signal outputted from said comb filter;

a delay circuit for delaying the color difference signal selected by said switch, for one horizontal scanning period; and an adder for adding the color difference signal delayed by said delay circuit to the color difference signal selected by said switch, and outputting the added result as said output color difference signal to be outputted from said comb filter, whereby said switch selects said output color difference signal for the dropout period of said input color difference signal so as to compensate said dropout.

13. An apparatus according to claim 1, wherein said signal processing means includes burst level substituting means for setting the level of a burst pulse in said at least one color difference signal at a predetermined value.

14. An apparatus according to claim 2, wherein said signal processing means includes burst level substituting means for setting the level of a burst pulse in at least one of said color difference signals at a predetermined value.

15. An apparatus according to claim 3, wherein said signal processing means includes burst level substituting means for setting the level of a burst pulse in at least one of said color difference signals at a predetermined value.

16. An apparatus according to claim 1, wherein said signal processing means includes noise reducing means for limiting the level of noises in said at least one color difference signal.

17. An apparatus according to claim 2, wherein said signal processing means includes noise reducing means for limiting the respective levels of noises in said color difference signals.

18. An apparatus according to claim 3, wherein said signal processing means includes noise reducing means for limiting the respective levels of noises in said color difference signals.

19. A video signal recording and reproducing apparatus comprising:

a variable gain amplifier for amplifying a chrominance signal of a reproduced color video signal;

a processing circuit for generating a predetermined signal from the chrominance signal outputted from said variable gain amplifier;

a burst substituting circuit fed with said predetermined signal outputted from said processing circuit for setting the burst level of the fed signal at a predetermined value and for outputting said predetermined signal for which said burst level is set at said predetermined value; and a gain control circuit for comparing the burst levels of said predetermined value set in said burst substituting circuit and of said predetermined signal inputted to said burst substituting circuit and for controlling the gain of said variable gain amplifier in accordance with the comparison result in a manner to equalize the burst levels of said predetermined signal at the input and output sides of said burst level substituting circuit.

20. An apparatus according to claim 19, wherein said processing circuit comprises a demodulator for demodulating said chrominance signal to generate a color difference signal in a base frequency band, and wherein said predetermined signal fed to said burst substituting circuit is said color difference signal.

21. An apparatus according to claim 19, wherein said chrominance signal is a down-converted chrominance signal, wherein said processing circuit comprises a frequency converter for converting said down-converted chrominance signal into a signal in a higher frequency band, and wherein said predetermined signal fed to said burst substituting circuit is a chrominance signal generated by said frequency converter and residing in a higher frequency band.

* * * * *